United States Patent [19]
Reed et al.

[11] Patent Number: 5,600,324
[45] Date of Patent: Feb. 4, 1997

[54] KEYLESS ENTRY SYSTEM USING A ROLLING CODE

[75] Inventors: Irving S. Reed, Santa Monica; Xiaowei Yin, Alhambra; Xuemin Chen, Los Angeles, all of Calif.

[73] Assignee: Rockwell International Corporation, Pittsburgh, Pa.

[21] Appl. No.: 609,093

[22] Filed: Feb. 29, 1996

Related U.S. Application Data

[63] Continuation of Ser. No. 881,417, May 11, 1992, abandoned.

[51] Int. Cl.$^6$ ..................................................... G08C 19/12
[52] U.S. Cl. .................. 341/176; 340/825.2; 340/825.3; 340/825.69; 340/825.56
[58] Field of Search ......................... 341/176; 340/825.2, 340/825.3, 825.31, 825.34, 825.69, 825.72, 825.56; 361/171, 172; 70/278; 380/43

[56] References Cited

U.S. PATENT DOCUMENTS

| | | | |
|---|---|---|---|
| 4,779,090 | 10/1988 | Micznik et al. | 340/825.69 |
| 4,847,614 | 7/1989 | Keller | 340/825.56 |
| 4,992,785 | 2/1991 | Lewiner et al. | 70/278 |
| 5,060,263 | 10/1991 | Bosen et al. | 340/825.31 |
| 5,068,894 | 11/1991 | Hoppe | 340/825.31 |
| 5,204,663 | 4/1993 | Lee | 340/825.3 |
| 5,365,225 | 11/1994 | Bachhuber | 340/825.31 |

Primary Examiner—Brent A. Swarthout
Assistant Examiner—Andrew Hill

[57] ABSTRACT

A keyless entry system which employs an identification code for each transmitter, a key sequence number, and a rolling code generated by a polynomial equation ensure unauthorized access. The system provides for resynchronization in the event of battery replacement or power failure. The system accommodates activation of a transmitter and incrementation of the rolling code when it is out of range of the receiver. This system further accommodates replacement of lost or stolen keys with a higher priority key, which then prevents access by the lost or stolen transmitter.

4 Claims, 4 Drawing Sheets

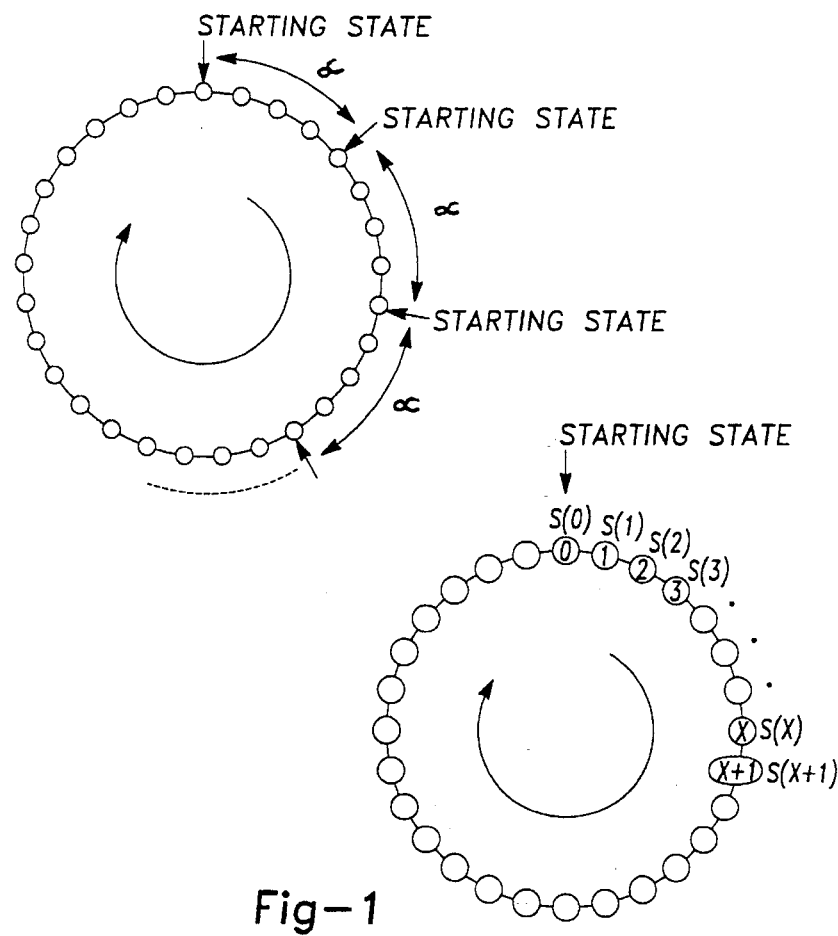
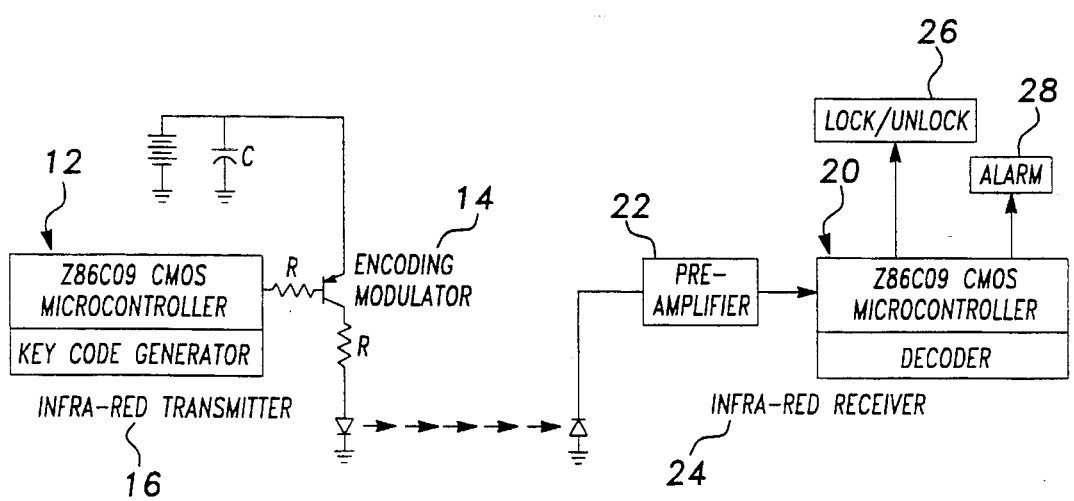
Fig-1
Fig-2

AN EXAMPLE: REPLACEMENT OF THE 4-th KEY:

THE MEMORY OF THE RECEIVER BEFORE CHANGE OF KEY

| KEY ID $n_1$ | $n_2$ | COUNTER | STATE STORED IN RECIEVER |
|---|---|---|---|
| 1 | k | $Y_1$ | $S(Y_1)$ |
| 2 | k | $Y_2$ | $S(Y_2)$ |
| 3 | k | $Y_3$ | $S(Y_3)$ |
| 4 | k | $Y_4$ | $S(Y_4)$ |

NOTE: k=PREDETERMINED INITIAL INTEGER

THE MEMORY OF THE RECEIVER BEFORE CHANGE OF KEY

| KEY ID $n_1$ | $n_2$ | COUNTER | STATE STORED IN RECIEVER |
|---|---|---|---|
| 1 | k | $Y_1$ | $S(Y_1)$ |
| 2 | k | $Y_2$ | $S(Y_2)$ |
| 3 | k | $Y_3$ | $S(Y_3)$ |
| 4 | k+1 | $Y_4^*$ | $S(Y_4^*)$ |

NOTE: $Y^*$ IS THE CONTER NUMBER OF THE NEW KEY

*Fig-3*

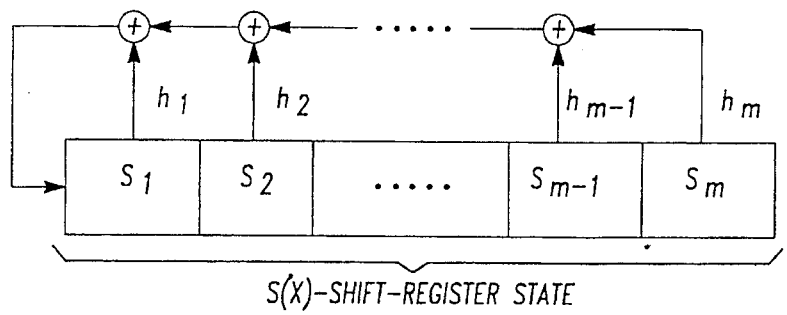

*Fig-6*

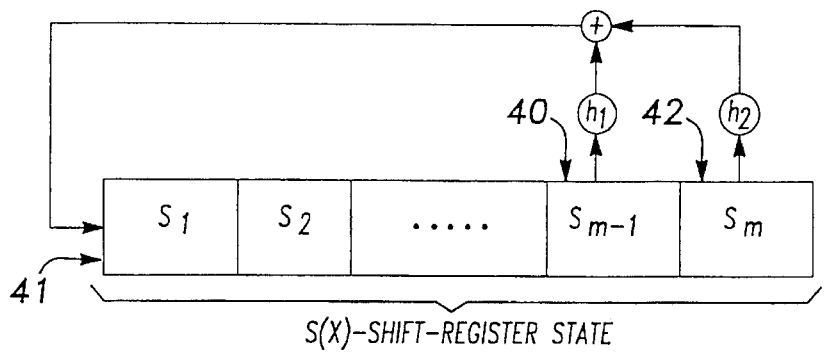

*Fig-7*

KEYLESS ENTRY SYSTEM USING A ROLLING CODE

This application is a file-wrapper continuation of U.S. Ser. No. 07/881,417, filed 11 May 1992, which is now abandoned in favor of this case.

FIELD OF THE INVENTION

The present invention generally relates to keyless entry and locking systems, including those using digital and analog encoding schemes.

BACKGROUND OF THE INVENTION

Keyless entry security systems have undergone a substantial expansion in the past few years. Initially, keyless entry systems were primarily used for garage door openers and the like. This allowed the driver of car to press a button and automatically open a garage door. The keyless entry systems typically employed one or more different frequencies which had to be received in order to initiate opening or closing of the garage door. A good quality system used two radio frequencies and one audio element. Later, modulation techniques were used in an attempt to further secure the systems and prevent unauthorized entry.

More recently, digital techniques have been used to generate encoding schemes. Additionally, keyless entry systems have become extensively used for security gates, automobile security systems, and the like. This has generated a need for a keyless entry system that cannot be defeated by an unauthorized individual. Techniques for defeating keyless entry security systems involve setting up an infrared, radio frequency (RF), or audio detector, and recording the keying sequence used to access or open the protected device. This apparatus is then used to recreate the entry code and allow unauthorized access.

SUMMARY OF THE INVENTION

In order to solve this problem, a keyless entry apparatus in which the code changes after each access is utilized. This prevents unauthorized entry by an individual who has learned the previously used access code, because the code changed immediately following the use of the access code. This leads to several technical hurdles, including resynchronization of the transmitter with the receiver in the event of power failure, or in the event that the transmitter is permanently lost or destroyed. The system must additionally accommodate the use of multiple transmitters which are all authorized to gain entry.

It is an object of the present invention to provide a keyless entry system.

It is a further object of the present invention to provide a keyless entry system which is difficult or impossible to defeat electronically.

It is a further object of the present invention to provide for a transmitter replacement in the event a transmitter becomes lost or stolen.

It is a further object of the present invention to prevent use of a lost or stolen transmitter once it has been replaced.

It is a further object of the present invention to provide a keyless entry system in which simultaneous, identical state changes occur in both the transmitter and receiver.

It is a further object of the present invention to provide a keyless entry system in which a new, or replacement transmitter is easily synchronized with the receiver.

It is a further object of the present invention to provide a unique identity for each transmitter.

It is a further object of the present invention to provide a keyless entry system in which more than one transmitter does not transmit the same state at any one point in time.

It is a further object of the present invention to provide a system whereby a finite number of transmitters may be used to gain access through a single receiver.

Our illustrative preferred embodiment of the present invention utilizes a multiple phase shift register and a polynomial equation to generate a rolling code which changes each time the receiver acknowledges receipt of a signal. The use of multiple transmitters and replacement transmitters are accommodated by identifying each transmitter with an identification code. Part of the identification code of each transmitter includes a key priority counter register. The key priority counter register allows a higher priority transmitter to replace a lower priority transmitter. The lower priority transmitter is no longer be able to gain access. This prevents use of a lost or stolen transmitter once a new transmitter is placed in service.

System resynchronization becomes necessary when the transmitter battery is replaced, a key is changed, or the rolling code in the transmitter rolls past the code stored in the receiver. The present invention accommodates conditions such battery replacement (which causes the transmitter to be re-initialized) by providing for resynchronization if the received code belongs to one of the first finite number of codes generated.

If the transmitter code advances beyond the code of the receiver because the transmitter has been triggered one or more times while being out of range of the receiver, the receiver searches forward in the rolling code sequence through a finite number of codes to resynchronize with the transmitter and allow access.

BRIEF DESCRIPTION OF THE DRAWINGS

FIG. 1 is a state diagram of the rolling code generator;

FIG. 2 is a block diagram showing the transmitter and receiver;

FIG. 3 is a new key set-up and required memory chart;

FIG. 6 is a diagram showing the feedback in a linear m-stage shift-register over $GF(q^m)$; and FIG. 7 is a diagram showing the linear feedback of a m-stage with feedback from the last two stages only.

DESCRIPTION OF A PREFERRED EMBODIMENT

Figure 4:
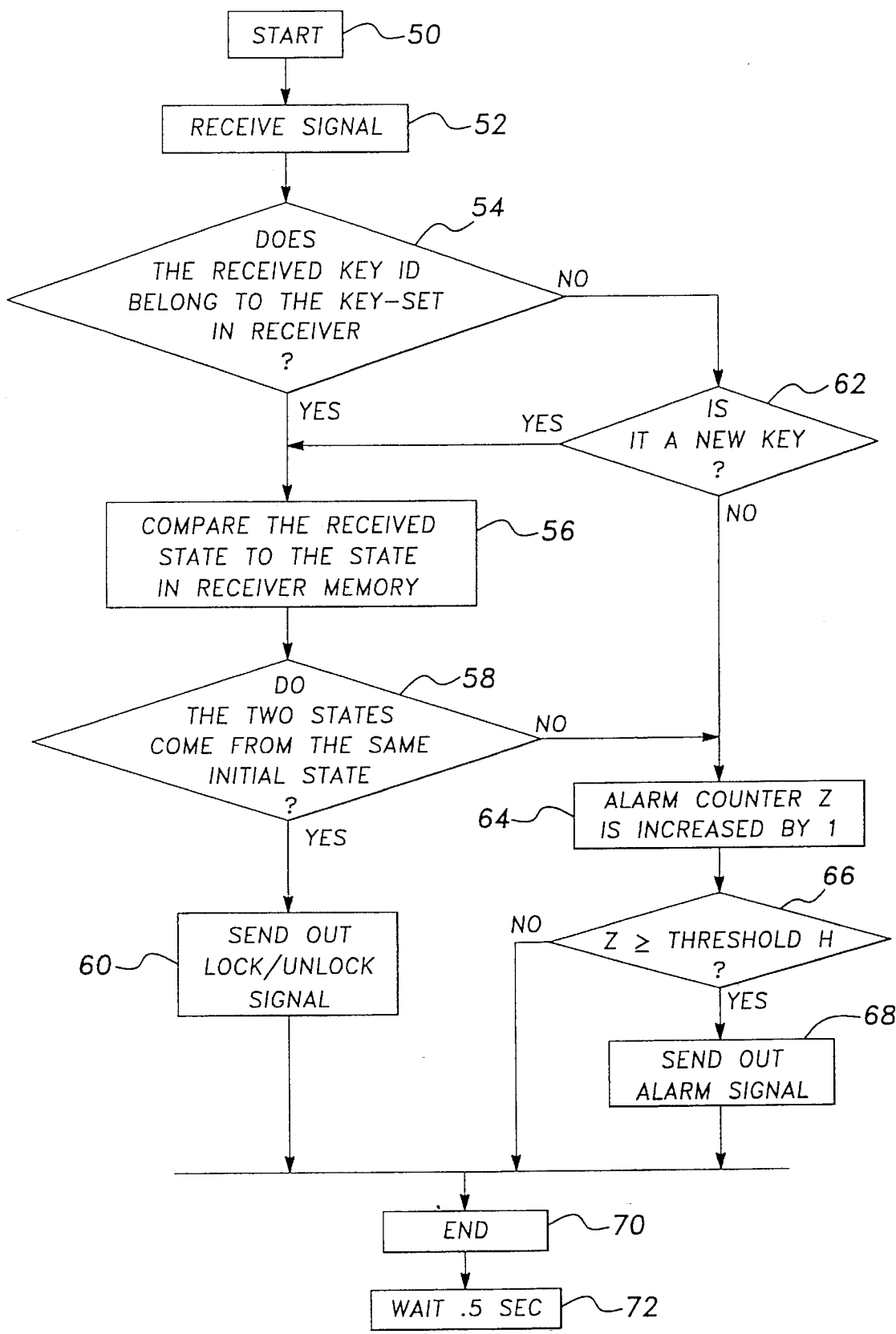
FIG. 4 is a functional flow chart of the decoding procedure.

To create a keyless entry system that cannot be defeated by unauthorized decoding or recording a valid entry code, and regenerating or replaying that code to gain unauthorized access, a security code is employed in the transmission. The security code changes following each transmission in order to prevent an unauthorized regeneration from gaining access to the security area protected by the keyless entry system. As shown in FIG. 1, this changing security code can be represented by a state diagram. The state of the transmitter increments to the next sequential state following transmission, and the state of the receiver increments to the next appropriate state following receipt of a valid transmission.

The number of states available are not limited to the number of discrete states shown in FIG. 1. The state generator will, eventually, return to the initial state after a large enough number of cycles have been executed. For this reason, the state generator can also be thought of as a rolling code generator.

The rolling code is a linear shift-register set sequence generated by a primitive polynomial of degree m over the residue number field of a prime integer q. The generated sequence has a maximum length, $q^m-1$. For m=5 and q=31, the maximum length sequence is $31^5-1=28,629,150$. For m=3 and q=127, it is $127^3-1=2,048,382$. The rolling code thereby establishes a finite, predetermined number of potential digital codes, based on the values of m and q.

The rolling code segment generated by the linear shift-register set for m=5 and q=31 have a cyclic state diagram with more than 28 million states distributed circularly as shown in FIG. 1. Each user starts from some fixed, initial state S(0), or predetermined starting code and shifts right by one state (to S(1), etc.,) around the state diagram to each successive sequential digital code each time the transmitter button is pushed. The current state S(X) is stored in the memory of the transmitter. When the transmit button is pushed, the current state S(X) of the transmitter is sent to the receiver with the number of the state X. The register in the transmitter then increments or shifts (right) by one state to state S(X+1) before the next transmission. The receiver receives the transmitter codes which are compared to the receiver's internal state. The receiver's internal state is the last state in which the transmitter's state and the receiver's state method or the initial state if not matched states have occurred. If these match, the receiver sends out an lock/unlock signal and shifts (right) one state, otherwise the received signal is ignored. In order to generate a match, the received transmission is compared with the receiver's state. In the preferred embodiment, identical codes generate a match. The inventors recognize that complementary transmitter codes can be employed (0's instead of 1's and 1's instead of 0's), as well as other variations which will result in an indication that an authorized signal was transmitted. In this manner the code is changed each time the system is used.

In order to further secure the keyless entry system, each transmitter and receiver is given an identification number. Additionally, each transmitter is given a sequential number. The identification number also known as a transmitter identification number or transmitter identification segment, assigned to each transmitter and receiver assures that all receivers will not respond to all transmitters. Additionally, the sequential transmitter numbers allow a transmitter to be replaced, and the old transmitter prevented from gaining access or entry through the receiver. This is especially useful if a transmitter is lost or stolen.

Receivers are distinguished to identify the receiver so that additional or replacement keys can be ordered from the manufacturer. Each transmitter is distinguished by one identification number (out of approximately 16 possible).

A finite number of transmitters are assigned to a given receiver. For example, four transmitter identification numbers are supplied to one receiver. This receiver will only respond to one of these transmitters. A larger or number of transmitters can be assigned to each receiver, as will be appreciated.

When receiving a message, the receiver will have to match each of the four possible transmitters it knows. A learning mode is provided to permit new transmitters to access the system, to change a lost transmitter, or synchronize a transmitter.

Two methods are provided to enter learning mode for the receiver. The first is sending an identification number only when a particular condition is met, such as an ignition key being inserted. This transmission takes a significantly long time to avoid scanning of the identification number. For example, three waves of one to twelve pulses, of one second each, separated by one second and 10 seconds between the waves. A fixed period of time, such as one minute after the end of sending the identification number (without any other information), causes the receiver to enter learning mode.

Additional information the receiver needs from the transmitter is the identification number of the transmitter. In the preferred embodiment, a car installation is implemented. In this implementation, there are four keys for each receiver (vehicle). Each time a car owner pushes the transmitter button, the identification number of the key, the value of the clock counter and the current rolling code state are sent to the receiver. The receiver contains the current states corresponding to each of the four keys and four shift-register memories to trace each key.

The auto-key system uses a low cost microprocessor for the system, and has low power consumption for relatively long battery life. The key to the system is the unique initial state of the shift register which is stored in the program of the microcontroller chip (Zilog Z86C09).

As shown in FIG. 2, each transmitter contains three major segments: A key code generator 12, an encoding modulator 14 and an infra-red transmitter 16. The key code generator is implemented with a Z86C09 CMOS microcontroller chip (or an equivalent). By pushing the transmit button (not shown), the user causes the transmitter to transmit a key code within the infrared bandwidth.

The receiver also contains three major segments: A decoder 20, a preamplifier 22 and an infra-red receiver 24. The decoder is also implemented in a Z86C09 CMOS microcontroller chip. When properly decoded, the infra-red bandwidth transmitted receiver transmitted signal produces an activation signal to the lock/unlock element 26 at the output of the receiver.

Based on market requirements, four keys are assigned to any one vehicle. As will be apparent, a greater or lesser number of keys may be implemented. These keys can be used interchangeably. Each key is resynchronized automatically and individually. Each key can be replaced by a new key. When a new key replaces an old key, the old key is made unavailable for use by the receiver.

To identify the four keys, four 8-bit registers are used to store transmitter identification numbers in the receiver. Each of these four registers contains a pair of numbers, $(n_1, n_2)$, where $n_1$ and $n_2$ are stored in the highest 4-bits and the lowest 4-bits of the register, respectively, as shown in FIG. 3. The integers, $n_1=1,2,3,4$, etc. are assigned to the successive keys of a vehicle. The integer $n_2$ is called the key number or transmitter sequence number. A low 4-bit key number is only replaced by a larger key number which represents a new key. For example, key (1,1) can be replaced by (1,2) or (1,3) and (1,2) can be replaced by (1,3), etc. In the example in FIG. 3, K represents a predetermined initial integer and $Y_1-Y_4$ represent the counter numbers of the original keys, and $Y_4^*$ represents the counter number of the new key. If a key is lost or damaged it is possible for a user to order a new key. The new key replaces the old key and the old key is made inoperative.

The rolling code is used to increase the security of the transmissions and prevent an authorized transmission which has been recorded by a user who was loaned a key or has intercepted a transmission from gain entry. The rolling code is generated by linear shift-registers.

The state of the code memory, or rolling code segment 5 S(X), as shown in FIG. 1, represents the state, or digital code, of the cyclic shift register set which will produce a coded sequence. For example, if S(X) consists of a number, m which is stored in 8-bit registers. In one embodiment, feedback connections are allowed only for the last two register sets 40 and 42 (see FIG. 7). As can be appreciated, feedback connections can be implemented for each register set in the sequence $s_1-s_m$. The numbers stored in each register are integers, modulo q, (integers Mod q). The next-state calculation is represented by:

$$s_1(X+1)=h_1 \cdot s_m(X)+h_2 \cdot s_m(X) \qquad \text{Modulo } q$$

where $s_k(X)$ is the $k^{th}$ register at the $X^{th}$ time as shown in FIG. 1 and 7. The selection of coefficients $(h_1, h_2)$ which lead to maximum sequences have been determined, based on mathematical calculations as will be described hereinafter.

A number, modulo q is stored in a register of sufficient length. For q=31, five (5) bits are needed. For q=127, 7 bits are needed, etc. The data stored in each register is shifted as a set to the next sequential register, hence the terminology register set. For example, the modulo 31 adder 41 shown in FIG. 7 consists of five registers, $s_1$ through $s_m$. Each register is m bits long. When a shift occurs, the data set in register $s_1$ is shifted in to register $s_2$, the data set in register $s_2$ shifted into register $s_3$, etc.

Feedback multipliers $h_1$, and $h_2$ are multiplied by the data sets in registers $s_{m-1}$ and $s_m$, respectively, and are then added together and fed back into register $s_1$. All mathematical operations, including multiplication and addition are performed by modulo 31. As can be appreciated, feedback multipliers can be provided for each of the registers $s_1$ through $s_m$, or selectively for any desired combination of registers. Additional registers can be added so that the feedback loop consists of six (6), seven (7), eight (8), or more registers.

Adding additional registers causes transmission of the rolling code to take a longer time since the contents of each of the registers must be transmitted to the receiver. For 5 registers 5 bits wide, 25 bits must be transmitted. For 8 registers 5 bits wide, 40 bits must be transmitted. Increasing the number of registers has the advantage of increasing the security of the system and simultaneously the disadvantage of requiring a longer period of time to transmit. Applicant believes that five registers, five bits wide optimizes this trade-off situation, however, a greater or fewer number of larger or smaller registers may be used effectively.

The multipliers $h_1$ and $h_2$ are selected to generate the longest possible rolling code sequence before repeating itself. These multipliers have been found using a Theorem described in Appendix A, combined with computer simulations described in Appendix B for an initial condition of registers a, b, c, and d=0 and register e=1, the multipliers $h_1=1$ and $h_2=12$ or $h_2=21$ produce 28,629,150 different states before starting to repeat states.

The rolling code is a linear shift-register sequence generated by a primitive polynomial of degree m over the Galois field GF($q^m$) where $q=2^p-1$ is a Mersenne prime number. The generated sequence of maximum length has length, $q^m-1$ and thereby establishes a predetermined number of digital codes. As stated earlier, for m=5 and q=31, the maximum length sequence is $31^5-1=28,629,150$. For q=127 and q=31 there are a total of 1,620 possible polynomials. If one assumes a user has minimum state distance of 28 with respect to other users, the present preferred embodiment can allow for at least a million different users.

There are resynchronization problems between the transmitter and the receiver in key-code systems of this type. The key code can roll past the stored code, memory lost during battery replacement, and changing a key.

Since the rolling code is generated in the transmitter, it is possible for the key code to roll past the code stored in the receiver. This can happen when the transmitter is activated and is not within range of the receiver. This occurs when the user presses the key in his office, etc. Hence, the receiver must be resynchronized with the transmitter.

Since there can be more than a million users in the circle of the same shift-register state-diagram, the receiver can get confused when two transmitter keys have different initial states. To prevent this, a register counter is used in both the transmitter and the receiver to distinguish between different users. The hierarchical code number stored in this counter is initialized to zero and is increased by one when the shift register shifts right by one state. The numbers in both the transmitter and the receiver are compared in the receiver. If the received hierarchical code number X, is less than the stored hierarchical code number, also known as the address number, the transmitter, Y, then the state in the receiver S(Y) is shifted right by X-Y states before the receiver compares transmitter and receiver state S(X). This is used to avoid problems created when a transmitter rolls past the receiver.

More than two multipliers may be used to obtain a different rolling code. As shown in FIG. 6, summation and feedback of m multipliers, one attached to each register, may be utilized to constantly update all registers and provide a different type of rolling code.

If the new state code generated by the rolling code generator in the transmitter matches the receiver's state code S(X), a lock/unlock signal is sent out and the old address number and old state in the receiver's memory are replaced by the new data from the transmission. If the two address numbers do not match or if X<Y, no lock/unlock signal is generated, and a warning number is incremented.

If the wrong key code is repeatedly transmitted a number of times, the alarm threshold is met, and, the receiver generates an alarm signal. The selection of a specific value for this alarm threshold is determined by the manufacturer or user, and is 20 in one preferred embodiment. The alarm threshold counter is reset when a valid transmission is received.

There is an exception for X<Y when the received hierarchical code number is within the first 100 states (X<100). This is designed for when the receiver power is shut off, as will be described hereinafter.

Another resynchronization problem occurs when a battery is replaced. If the battery in the receiver is replaced or receiver power lost, the receiver's memory will be lost. All of the registers in the receiver are re-initialized back to the initial condition by a routine stored in PROM (or EPROM) of the microcontroller. This is similar to when the transmitter key code has rolled past the receiver memory code. When the receiver is next activated, the receiver will search forward for a matching code.

If the battery in the transmitter is replaced, the transmitter memory is re-initialized back to its initial condition. If the received code is one of the first 100 codes, the lock/unlock signal is sent and the receiver memory is reset by the received code.

FIG. 3 shows how the memory contents in the receiver change when a new key or a replacement key is used.

The rolling-code system of the present invention has many advantages over other keyless entry systems. The present invention does not require manual resynchronization usually employed, which requires special buttons. The rolling code system is able to avoid access by an unauthorized user, such as recorded transmissions obtained from loaned or stolen keys. This is achieved in such a manner that does not inconvenience an user.

Usually, the state of the rolling code in the transmitter of the system is equal to or later in the rolling-code sequence than the state of code in the receiver. That is, the rolling code stored in the receiver can only roll forward to the code of the currently received message. If a transmission waveform is recorded during operation of the keyless entry system, such as an unauthorized party or thief recording the waveform with the intention of breaking into the system, the code stored in the receiver will roll past the code during the valid operation. Thus, the code recorded by the unauthorized party will be invalid, as the receiver code will have rolled past the recorded code, and the vehicle door will not open.

Another factor which helps to ensure security in this system is the number of possible states of the shift register. For example, if q=127 there are more than 1620 primitive polynomials which can be used to generate a maximum length sequence. Therefore, the system allows $1620 \cdot (127^3-1)=3,318,378,840$ different users with a minimum state distance of one, or about 165 million users with an average minimum state distance of 20.

Additionally, multiple transmissions within 0.5 second of each other are ignored by the receiver. Thus, a complete automated search for the correct code could require more than a month to match the receiver's code and unlock the door.

The present invention keeps track of the number of attempted accesses which are unsuccessful between successful accesses by authorized keys in a register referred to herein as the alarm counter. These attempted accesses may result from accesses of nearby vehicles or equipment, or the attempted accesses may be an effort to "break in" by defeating the keyless entry system. After a predetermined threshold number of unsuccessful accesses, the keyless entry system generates an alarm signal 28 (FIG. 2). The alarm counter register is reset when successful access occurs. The threshold number of unsuccessful accesses is set at 20, but may be larger or smaller based on the user's desires.

Referring to FIG. 4 (which is a functional flow chart showing the decoding operation), operation is begun by a transmitter 50 (not shown) transmitting an infrared signal which is received by the receiver 52. The receiver first checks to determine whether or not the key belongs to the set of acceptable keys for the particular receiver. If the key does belong to the set of keys for this receiver, the received state 50 of the rolling code generator is compared to the state stored in receiver memory 56. The receiver then checks to see if the two states come from the same initial state 58. If so, then a lock/unlock signal 60 is generated. If the key dos not belong to the set of acceptable set of keys for this receiver, the receiver will check to see if it is a new key, or a replacement key 62. If the key is a new or replacement key, then the receiver will recognize the key as belonging to the set of keys acceptable for this receiver and proceed to step 56. If the receiver does not recognize this key as being a new key or a replacement key, then the alarm counter is incremented, 64. Similarly, if the receiver determines that the two states do not come from the same initial state 58, then the alarm counter is incremented 64. The receiver then checks to determine whether the alarm counter has exceeded the threshold number of unsuccessful accesses 66. If this number has been exceeded, then an alarm signal 68 is generated.

If this number is not exceeded, then no alarm signal is generated. After generating a lock/unlock signal, sending out an alarm signal, or merely incrementing the alarm counter, the decoding procedure reaches an end 70. At this point, the receiver will wait for 0.5 second 72 then return to the initial condition and begin to accept a subsequent transmission 50.

Figure 5:
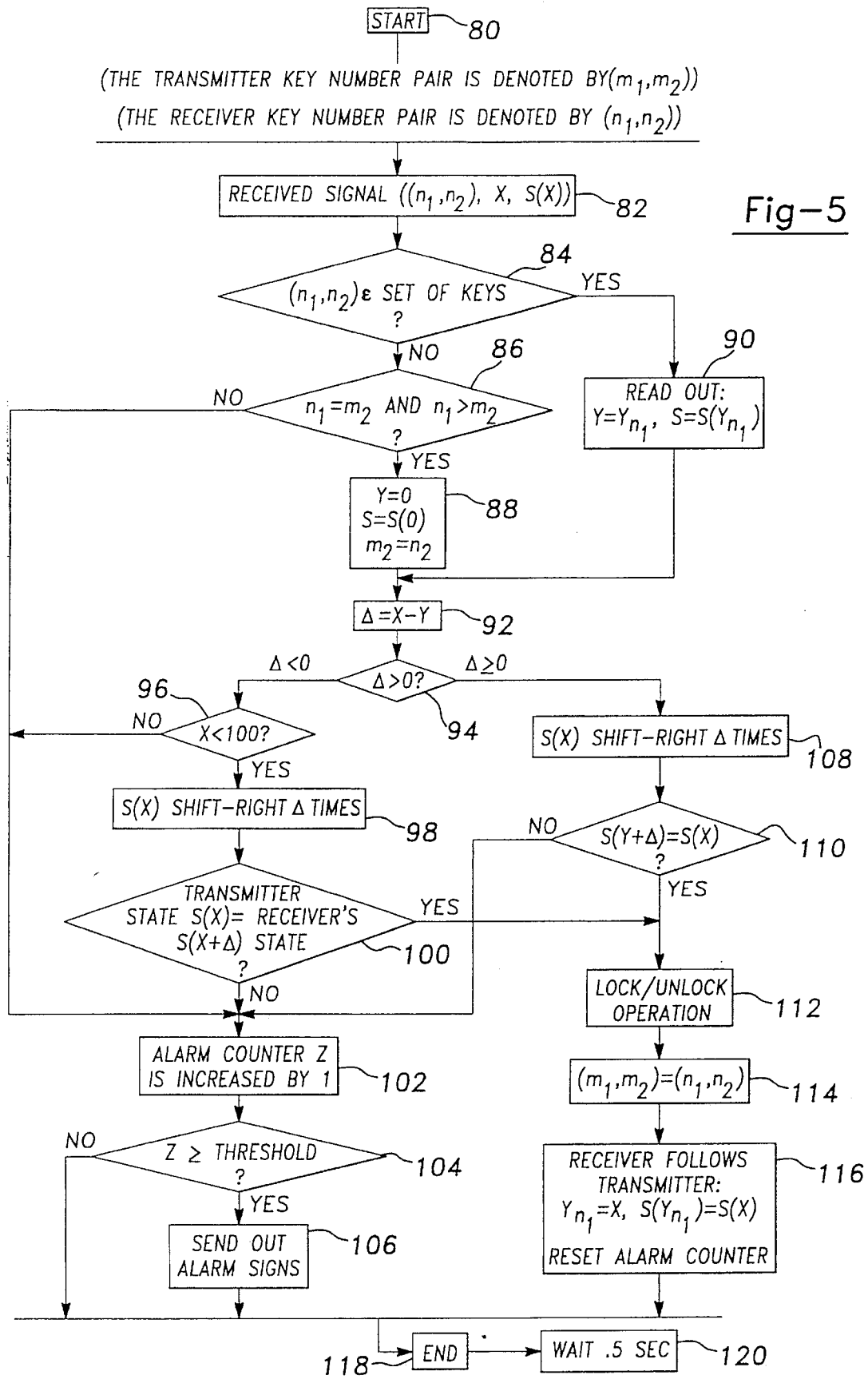
FIG. 5 is a flow chart of the decoding program.

A more detailed flow chart is shown in FIG. 5. The start of the cycle 80 includes the time the receiver is awaiting a transmission by a transmitter (not shown). For clarity, the key number pair of the receiver is designated $(m_1, m_2)$ and the key number pair of the transmitter, known as the transmitter key identification code or transmitter identification signal, designated $(n_1, n_2)$. In step 82, the received signal is decoded and the fields separated. In step 84, the receiver determines whether the key number pair $(n_1, n_2)$ belongs to the set of keys for this receiver. If the transmitter is not identified through the key number pair as one of the keys for this receiver, then the receiver checks to see whether the transmitter is a replacement transmitter. This is checked in step 86 by the receiver checking to see if $n_2$, or transmitter sequence number, is greater than $m_2$. If this is true, and $n_1$ is equal to $m_1$, then the receiver recognizes this transmitter as a replacement transmitter.

The receiver will then update $m_2$ by setting it equal to $n_2$ in step 88. The receiver will also set the internal register holding the state of the new key to the initial condition, state 0.

If the receiver has determined in step 84 that the transmission comes from a key which is one of the set of keys authorized to provide access, then the receiver will decode, or read out, the transmitter's state and state number 90. At this point, the system will treat present acceptable keys and new keys in an identical fashion. The system will proceed to step 92 where it determines the difference between the state of the transmitter and the state of the receiver. The system will then evaluate whether the state of the transmitter is the same, or a later state than the state of the receiver 94. If the state of the transmitter has rolled past the state of the receiver, the receiver will increment the receiver's state in order to equal the state number of the transmitter 108.

The system then evaluate whether the actual state of the state generator in the transmitter is equal to the state of the receiver after the state of the receiver has been incremented 110. If the states match, then a lock/unlock operation 112 is executed. The receiver's key number pair $(m_1, m_2)$ is then updated to equal the transmitter's key number pair $(n_1, n_2)$ 114. The state of the receiver is then updated to equal the state of the transmitter. The state number of the receiver is updated to equal the state number of the transmitter, and the alarm counter is reset 116.

The system then waits 0.5 second 118, then ends 120 the program flow. The system then returns to the start, step 80 and awaits the next transmission.

If the state number of the transmitter is lower than the state number of the receiver in step 94, then the receiver checks to see whether the state number of the transmitter is within the first 100 states of the transmitter step 96. If the state of the transmitter is within the first 100 states, then the receiver's state generator is reinitialized to the starter state, or initial condition, state zero, of the transmitter, then incremented to the state number corresponding to the number of the transmitter's state, 98. Next, the state of the transmitter is compared to the state of the receiver 100. If the two states are identical, then a lock/unlock operation 112 is executed followed by steps 114, 116, 118, 120 and 80.

If the states of the transmitter and receiver are not the same at this point, 100, then the alarm counter is incremented by one in step 102. The count of the alarm counter is then compared to the threshold value which was predetermined for the alarm counter. If the alarm counter count equals or exceeds the threshold value 104, then an alarm signal is generated 106. The system then waits 0.5 seconds 118 then ends the decoding routine 120 and returns to the start 80.

If the alarm counter threshold has not been met, the program flow proceeds to step 118 where it waits for 0.5 seconds and then ends 120 and returns to step 80 at the start of the program.

The alarm counter will also be incremented in step 102 if the conditions are not met in step 86, 96 or 110 (the transmitter key number is not greater than the key number stored in the receiver, indicating that an old key is not being replaced; the transmitter state number is less than the receiver's state number for the particular key, but the transmitter's state number is not within the first 100 states; or the state of the receiver is not equal to the state of the transmitter.)

The present rolling code system has another advantage of having the same transmitter and receiver except for a slight difference in the program stored in PROM and the transmitter or receiver element. The transmitter can be of reduced size to satisfy mechanical packaging requirements. This design is simple and durable.

Another piece of information the receiver receives from the transmitter is the identification number of the key. Based on market requirements, four keys are designated for each vehicle (receiver). Every time a car owner pushes the transmitter button, the identification number of the key, the value of counter and the current state are sent simultaneously to the receiver. Corresponding to the four keys, the receiver has four counters and four shift-register memories to trace each key. Memory arrangements for these four transmitters and the receiver are shown in FIG. 3.

The auto-key system is a low cost microprocessor for the system and has a relatively long battery life. The decoder program flow chart is shown in FIGS. 4 and 5. It is important to note that for each receiver, the key to the system is the unique initial state of the shift register, which is pre-stored in the program of the microcontroller chip (Z86C09).

There has been described hereinabove a novel, keyless entry system. It is recognized that deviations in polynomial generation, transmitter identification numbers, resynchronization methods, the number of transmitters allowed entry through any one receiver, the selection of a microprocessor, selection of a transmission medium, and the like, may be made. A larger or smaller polynomial may be used. The starting points may be predetermined, or may be programmable. Resynchronization may require continuous operation of the transmitter for a period of two minutes, or other methods of resynchronization after battery replacement or power failure can be employed. A different microprocessor can be used. Infrared transmission can be replaced by radio frequency transmission, either amplitude- or frequency-modulated. The number of transmitters that can gain entry through a receiver can be decreased or increased to 100 or more. Those skilled in the art may now make numerous uses of and departures from the above described embodiments without departing from the inventive concepts which are defined solely by the following claims.

APPENDIX A

The Linear Feedback Shift-Register Over $GF(q^m)$

The linear feedback shift-register generated by a polynomial is shown in Fig. 1. The linear feedback shift register is composed of $m$ registers, $s_1, s_2, \cdots, s_m$, with the feedback polynomial, $$f = h_1 \cdot s_{m-1} \oplus h_2 \cdot s_m$$

where $\oplus$ denotes addition modulo $q$.

The initial sequence of integers, modulo $q$, stored in the shift-register is given by $s_1(0), s_2(0), \cdots, s_{m-1}(0), s_m(0)$. The contents of the m-stage shift-register in Fig. 1 is shifted right one stage by a clock pulse. That is, $s_j \rightarrow s_{j+1}$ for $j = 1, 2, \cdots, m-1$. At the same time, the value of $$f = h_1 \cdot s_{m-1} \oplus h_2 \cdot s_m$$

is transferred to the first register, that is $f \rightarrow s_1$.

The linear feedback shift-register over $GF(q^m)$ in Fig. 1 can be expressed also in the form of a matrix as follows:

$$S(X+1) = H \cdot S(X) \tag{A.1}$$

where $$S(X+1) = [s_1(X+1), s_2(X+1), \cdots, s_m(X+1)],$$

$$S(X) = [s_1(X), s_2(X), \cdots, s_m(X)],$$

and $H$ is a $m \times m$ matrix, defined by $$H = \begin{bmatrix} 0 & 1 & 0 & \cdot & 0 \\ 0 & 0 & 1 & \cdot & 0 \\ \cdot & \cdot & \cdot & \cdot & \cdot \\ 0 & 0 & 0 & \cdot & 1 \\ h_1 & h_2 & 0 & \cdot & 0 \end{bmatrix}$$

In order to generate all distinct non-zero elements of $GF(q^m)$ in the linear-shaft register, the matrix $H$ in (A.1) should be a primitive matrix, that is, $$H^{q^m-1} = I \bmod q \tag{A.2}$$

where $q^m-1$ is the smallest integer such that $q^m-1$ satisfies (A.2). To find such a primitive matrix, the following theorem is needed.

Theorem 1: Let $GF(q^m)$ be a finite field, where $q^m-1 = p_1^{t_1} p_2^{t_2} \cdots p_r^{t_r}$ and $(p_i, p_j) = 1$, for $i \neq j$. Then $H$ is a primitive matrix for a linear feedback shift register in $GF(q^m)$ if and only if $H^{\frac{q^m-1}{p_i}} \neq I \mod q$ for $1 \leq i \leq r$.

Proof: If $H$ is a primitive matrix in $GF(q^m)$, then $q-1$ is the smallest integer such that $H^{q-1} = I \mod q$. This implies $H^{\frac{q^m-1}{p_i}} \neq I \mod q$ for $1 \leq i \leq n$. Now assume $H$ is not an element of order $q^m-1$. Then the order of $H$ satisfies $O(H) < q^m-1$, where O(H) denotes the cyclic group order of matrix $H$. Thus, there exists an integer $h \neq 1$ such that $$q^m-1 = p_1^{t_1} p_2^{t_2} \cdots p_r^{t_r} = h \cdot O(H). \qquad (A.3)$$

From (A.3), one observes that $p_i/h$ for some $i$. Therefore, $H^{\frac{q^m-1}{p_i}} = I \mod q$. This proves that the above conditions of the theorem are necessary and sufficient for the matrix $H$ to be primitive.

Example 1: The primitive matrix of a linear feedback 3-stage shift register over $GF(3^3)$.

The linear feedback 3-stage shift-register over $GF(3^3)$ is shown in Fig. 2. Let $h_1 = 2$ and $h_2 = 1$. The matrix for these connections is $$H = \begin{matrix} 0 & 1 & 0 \\ 0 & 0 & 1 \\ h_1 & h_2 & 0 \end{matrix} = \begin{matrix} 0 & 1 & 0 \\ 0 & 0 & 1 \\ 2 & 1 & 0 \end{matrix}$$

Since $q^m-1 = 3^3-1 = p_1 p_2 = 2 \times 13$, then $$H^{\frac{q^m-1}{p_2}} = H^{\frac{3^3-1}{13}} = \begin{matrix} 0 & 1 & 0 \\ 0 & 0 & 1 \\ 2 & 1 & 0 \end{matrix}^2 = \begin{matrix} 0 & 0 & 1 \\ 2 & 1 & 0 \\ 0 & 2 & 1 \end{matrix} \neq I$$

and $$H^{\frac{q^m-1}{p_1}} = H^{\frac{3^3-1}{2}} = \begin{matrix} 0 & 1 & 0 \\ 0 & 0 & 1 \\ 2 & 1 & 0 \end{matrix}^{13} = \begin{matrix} 0 & 2 & 0 \\ 0 & 1 & 2 \\ 1 & 0 & 1 \end{matrix} \neq I$$

Since by Theorem 1, H is a primitive matrix over $GF(3^3)$ which generates all of the non-zero distinct elements of the field $GF(3^3)$. These $3^3-1$ states could be, in fact, used in a small rolling code type of key system.

APPENDIX B
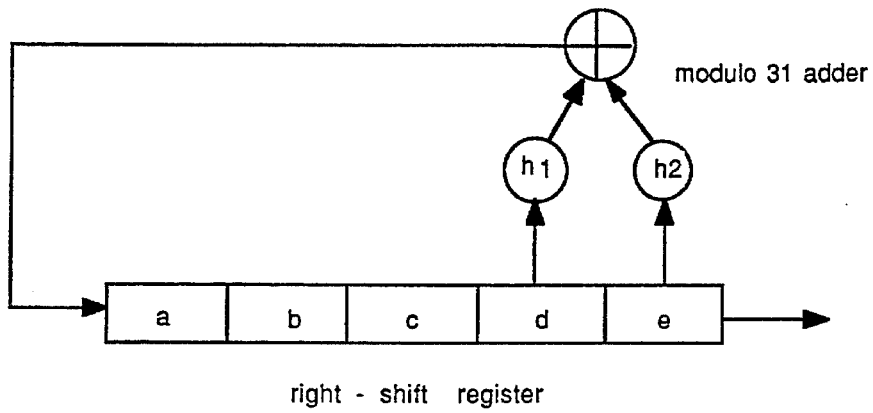
right - shift register
SIMULATION RESULT EXAMPLES
| initial condition | | | | | weights | | the number of states |
|---|---|---|---|---|---|---|---|
| a | b | c | d | e | h1 | h2 | |
| 0 | 0 | 0 | 0 | 1 | 1 | 12 | 28629150 |
| 0 | 0 | 0 | 0 | 1 | 1 | 21 | 28629150 |
| 0 | 0 | 0 | 0 | 1 | 2 | 12 | 28629150 |
| 0 | 0 | 0 | 0 | 1 | 2 | 21 | 28629150 |
| 0 | 0 | 0 | 0 | 1 | 3 | 3 | 28629150 |
| 0 | 0 | 0 | 0 | 1 | 4 | 12 | 28629150 |
| 0 | 0 | 0 | 0 | 1 | 4 | 21 | 28629150 |
(USING C LANGUAGE IN A SUN WORKSTATION 3/60)

```
/*****************************************************************/
/*                                                               */
/*      The Program for Serching the coefficients of a           */
/*      code generator which can generate maximum group          */
/*      code sequence.                                           */
/*                                                               */
/*      .the feedback connections are h1 and h2.                 */
/*      .the shift register with modulo 31.                      */
/*      .input data must be integers less than 31.               */
/*                                                               */
/*****************************************************************/
main()
{
   int a,b,c,d,e,f,a1,b1,c1,d1,e1,h,i;
   int g,count;
   printf("Please input initial condition : ");
   scanf("%d, %d, %d, %d, %d",&a,&b,&c,&d,&e);
   a1=a; b1=b;  c1=c;   d1=d;    e1=e;
   for(h=1; h<31; h++)
      {
       for(i=1; i<31; i++)
          {
           a=a1; b=b1;    c=c1;    d=d1;    e=e1;
           g=0;  count=0;
           do
            {
            f=d*h+e*i+31;
            f=f%31;
            count+=1;
            e=d;     d=c;     c=b;    b=a;    a=f;
            if (a1==a)
              {
               if (b1==b)
                 {
                  if (c1==c)
                    {
                     if (d1==d)
                       {
                        if (e1==e)
                              g=1;
                        else
                              g=0;
                       }
                     else
                          g=0;
                    }
                  else
                       g=0;
                 }
               else
                    g=0;
              }
            else
                 g=0;
            }
           while (g != 1);
           if (count==28629150)
              {
                printf("\n the weight h1 and h2 are : %d,%d", h, i);
              }
          }
      }
}
```

The Input Initial Condition is :
   a=0, b=0, c=0, d=0, e=1,
In order to obtain a largest group of code sequence, the combinations between the coefficients h1 and h2 can be :

(1) (h1,h2) = ( 1,12), (2) (h1,h2) = ( 1,21), (3) (h1,h2) = ( 2,12),
(4) (h1,h2) = ( 2,21), (5) (h1,h2) = ( 3, 3), (6) (h1,h2) = ( 4,12),
(7) (h1,h2) = ( 4,21), (8) (h1,h2) = ( 5,21), (9) (h1,h2) = ( 6, 3),
(10) (h1,h2) = ( 7,12), (11) (h1,h2) = ( 8,12), (12) (h1,h2) = ( 8,21),
(13) (h1,h2) = ( 9,21), (14) (h1,h2) = (10,21), (15) (h1,h2) = (12, 3),
(16) (h1,h2) = (14,12), (17) (h1,h2) = (15,13), (18) (h1,h2) = (16,12),
(19) (h1,h2) = (16,21), (20) (h1,h2) = (17, 3), (21) (h1,h2) = (18,21),
(22) (h1,h2) = (19,12), (23) (h1,h2) = (20,21), (24) (h1,h2) = (23,13),
(25) (h1,h2) = (24, 3), (26) (h1,h2) = (25,12), (27) (h1,h2) = (27,13),
(28) (h1,h2) = (28,12), (29) (h1,h2) = (29,13), (30) (h1,h2) = (30,13),

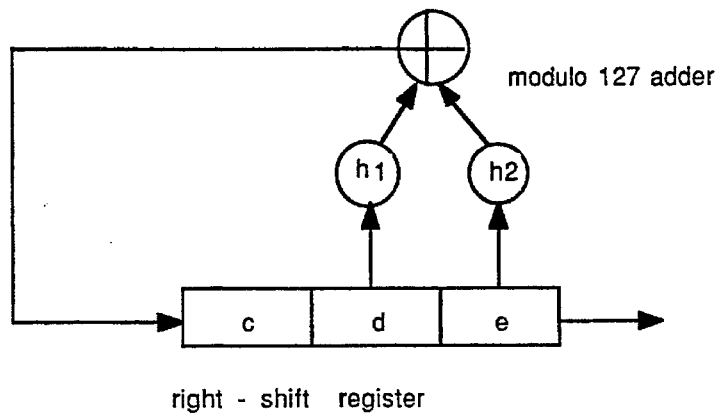
right - shift register
SIMULATION RESULT EXAMPLES
| initial condition | | | weights | | the number of states |
|---|---|---|---|---|---|
| c | d | e | h1 | h2 | |
| 0 | 0 | 1 | 1 | 3 | 2048382 |
| 0 | 0 | 1 | 1 | 23 | 2048382 |
| 0 | 0 | 1 | 1 | 53 | 2048382 |
| 0 | 0 | 1 | 1 | 55 | 2048382 |
| 0 | 0 | 1 | 1 | 56 | 2048382 |
| 0 | 0 | 1 | 1 | 78 | 2048382 |
| 0 | 0 | 1 | 2 | 14 | 2048382 |
| 0 | 0 | 1 | 2 | 23 | 2048382 |
| 0 | 0 | 1 | 2 | 45 | 2048382 |
| 0 | 0 | 1 | 2 | 55 | 2048382 |
(USING C LANGUAGE IN A SUN WORKSTATION 3/60)

```
/* the shift register with modulo 127 */
/* input data must be integers less than 127 */
main()
{
  int c,d,e,f,c1,d1,e1,h,i;
  int g,count;
  printf("Please input initial condition : ");
  scanf("%d, %d, %d",&c,&d,&e);
  c1=c; d1=d;   e1=e;
  for(h=1; h<127; h++)
    {
      for(i=1; i<127; i++)
        {
          c=c1;   d=d1;   e=e1;
          g=0;   count=0;
          do
            {
            f=d*h+e*i+127;
            f=f%127;
            count+=1;
            e=d;    d=c;    c=f;
                if (c1==c)
                  {
                    if (d1==d)
                      {
                        if (e1==e)
                              g=1;
                        else
                              g=0;
                      }
                    else
                        g=0;
                  }
                else
                    g=0;
            }
          while (g != 1);
          if (count==2048382)
            {
              printf("\n the weight h1 and h2 are : %d,%d", h, i);
            }
        }
    }
}
```

```
Please input initial condition :
  the weight h1 and h2 are : 1,3
  the weight h1 and h2 are : 1,23
  the weight h1 and h2 are : 1,53
  the weight h1 and h2 are : 1,55
  the weight h1 and h2 are : 1,56
  the weight h1 and h2 are : 1,78
  the weight h1 and h2 are : 1,91
  the weight h1 and h2 are : 1,92
  the weight h1 and h2 are : 1,93
  the weight h1 and h2 are : 1,112
  the weight h1 and h2 are : 1,114
  the weight h1 and h2 are : 1,118
  the weight h1 and h2 are : 2,14
  the weight h1 and h2 are : 2,23
  the weight h1 and h2 are : 2,45
  the weight h1 and h2 are : 2,55
  the weight h1 and h2 are : 2,58
  the weight h1 and h2 are : 2,83
  the weight h1 and h2 are : 2,92
  the weight h1 and h2 are : 2,93
  the weight h1 and h2 are : 2,96
  the weight h1 and h2 are : 2,101
  the weight h1 and h2 are : 2,109
  the weight h1 and h2 are : 2,110
  the weight h1 and h2 are : 2,114
  the weight h1 and h2 are : 2,118
  the weight h1 and h2 are : 3,6
  the weight h1 and h2 are : 3,12
  the weight h1 and h2 are : 3,23
  the weight h1 and h2 are : 3,39
  the weight h1 and h2 are : 3,53
  the weight h1 and h2 are : 3,55
  the weight h1 and h2 are : 3,57
  the weight h1 and h2 are : 3,65
  the weight h1 and h2 are : 3,93
  the weight h1 and h2 are : 3,96
  the weight h1 and h2 are : 3,101
  the weight h1 and h2 are : 3,112
  the weight h1 and h2 are : 3,114
  the weight h1 and h2 are : 3,116
  the weight h1 and h2 are : 4,7
  the weight h1 and h2 are : 4,23
  the weight h1 and h2 are : 4,43
  the weight h1 and h2 are : 4,55
  the weight h1 and h2 are : 4,57
  the weight h1 and h2 are : 4,67
  the weight h1 and h2 are : 4,78
  the weight h1 and h2 are : 4,91
  the weight h1 and h2 are : 4,92
  the weight h1 and h2 are : 4,93
  the weight h1 and h2 are : 4,101
  the weight h1 and h2 are : 4,109
  the weight h1 and h2 are : 4,116
  the weight h1 and h2 are : 5,14
  the weight h1 and h2 are : 5,23
  the weight h1 and h2 are : 5,29
  the weight h1 and h2 are : 5,39
  the weight h1 and h2 are : 5,43
  the weight h1 and h2 are : 5,57
  the weight h1 and h2 are : 5,67
  the weight h1 and h2 are : 5,86
  the weight h1 and h2 are : 5,92
  the weight h1 and h2 are : 5,93
  the weight h1 and h2 are : 5,97
  the weight h1 and h2 are : 5,112
```

```
                          are
the weight h1 and h2 as  : 6,3
the weight h1 and h2 are : 6,29
the weight h1 and h2 are : 6,45
the weight h1 and h2 are : 6,46
the weight h1 and h2 are : 6,48
the weight h1 and h2 are : 6,55
the weight h1 and h2 are : 6,57
the weight h1 and h2 are : 6,58
the weight h1 and h2 are : 6,65
the weight h1 and h2 are : 6,92
the weight h1 and h2 are : 6,101
the weight h1 and h2 are : 6,109
the weight h1 and h2 are : 7,3
the weight h1 and h2 are : 7,29
the weight h1 and h2 are : 7,45
the weight h1 and h2 are : 7,46
the weight h1 and h2 are : 7,48
the weight h1 and h2 are : 7,55
the weight h1 and h2 are : 7,57
the weight h1 and h2 are : 7,58
the weight h1 and h2 are : 7,65
the weight h1 and h2 are : 7,92
the weight h1 and h2 are : 7,101
the weight h1 and h2 are : 7,109
the weight h1 and h2 are : 8,6
the weight h1 and h2 are : 8,23
the weight h1 and h2 are : 8,29
the weight h1 and h2 are : 8,46
the weight h1 and h2 are : 8,55
the weight h1 and h2 are : 8,57
the weight h1 and h2 are : 8,83
the weight h1 and h2 are : 8,97
the weight h1 and h2 are : 8,101
the weight h1 and h2 are : 8,106
the weight h1 and h2 are : 8,109
the weight h1 and h2 are : 8,110
the weight h1 and h2 are : 8,112
the weight h1 and h2 are : 8,118
the weight h1 and h2 are : 9,7
the weight h1 and h2 are : 9,12
the weight h1 and h2 are : 9,14
the weight h1 and h2 are : 9,29
the weight h1 and h2 are : 9,39
the weight h1 and h2 are : 9,46
the weight h1 and h2 are : 9,53
the weight h1 and h2 are : 9,56
the weight h1 and h2 are : 9,58
the weight h1 and h2 are : 9,83
the weight h1 and h2 are : 9,86
the weight h1 and h2 are : 9,93
the weight h1 and h2 are : 9,97
the weight h1 and h2 are : 9,116
the weight h1 and h2 are : 10,6
the weight h1 and h2 are : 10,23
the weight h1 and h2 are : 10,39
the weight h1 and h2 are : 10,46
the weight h1 and h2 are : 10,55
the weight h1 and h2 are : 10,56
the weight h1 and h2 are : 10,67
the weight h1 and h2 are : 10,85
the weight h1 and h2 are : 10,86
the weight h1 and h2 are : 10,101
the weight h1 and h2 are : 10,106
the weight h1 and h2 are : 10,112
the weight h1 and h2 are : 10,114
the weight h1 and h2 are : 11,3
```

```
the weight h1 and h2 are : 11,7
the weight h1 and h2 are : 11,39
the weight h1 and h2 are : 11,58
the weight h1 and h2 are : 11,65
the weight h1 and h2 are : 11,78
the weight h1 and h2 are : 11,83
the weight h1 and h2 are : 11,86
the weight h1 and h2 are : 11,91
the weight h1 and h2 are : 11,97
the weight h1 and h2 are : 11,101
the weight h1 and h2 are : 11,106
the weight h1 and h2 are : 11,112
the weight h1 and h2 are : 11,116
the weight h1 and h2 are : 12,6
the weight h1 and h2 are : 12,7
the weight h1 and h2 are : 12,12
the weight h1 and h2 are : 12,23
the weight h1 and h2 are : 12,39
the weight h1 and h2 are : 12,43
the weight h1 and h2 are : 12,46
the weight h1 and h2 are : 12,48
the weight h1 and h2 are : 12,57
the weight h1 and h2 are : 12,58
the weight h1 and h2 are : 12,78
the weight h1 and h2 are : 12,96
the weight h1 and h2 are : 12,109
the weight h1 and h2 are : 13,3
the weight h1 and h2 are : 13,6
the weight h1 and h2 are : 13,43
the weight h1 and h2 are : 13,53
the weight h1 and h2 are : 13,55
the weight h1 and h2 are : 13,56
the weight h1 and h2 are : 13,58
the weight h1 and h2 are : 13,85
the weight h1 and h2 are : 13,86
the weight h1 and h2 are : 13,96
the weight h1 and h2 are : 13,101
the weight h1 and h2 are : 13,114
the weight h1 and h2 are : 14,6
the weight h1 and h2 are : 14,7
the weight h1 and h2 are : 14,12
the weight h1 and h2 are : 14,23
the weight h1 and h2 are : 14,39
the weight h1 and h2 are : 14,43
the weight h1 and h2 are : 14,46
the weight h1 and h2 are : 14,48
the weight h1 and h2 are : 14,57
the weight h1 and h2 are : 14,58
the weight h1 and h2 are : 14,78
the weight h1 and h2 are : 14,96
the weight h1 and h2 are : 14,109
the weight h1 and h2 are : 15,3
the weight h1 and h2 are : 15,12
the weight h1 and h2 are : 15,29
the weight h1 and h2 are : 15,43
the weight h1 and h2 are : 15,45
the weight h1 and h2 are : 15,48
the weight h1 and h2 are : 15,57
the weight h1 and h2 are : 15,65
the weight h1 and h2 are : 15,85
the weight h1 and h2 are : 15,91
the weight h1 and h2 are : 15,93
the weight h1 and h2 are : 15,106
the weight h1 and h2 are : 15,114
the weight h1 and h2 are : 16,39
the weight h1 and h2 are : 16,46
```

```
the weight h1 and h2 are : 16,56
the weight h1 and h2 are : 16,57
the weight h1 and h2 are : 16,65
the weight h1 and h2 are : 16,91
the weight h1 and h2 are : 16,93
the weight h1 and h2 are : 16,101
the weight h1 and h2 are : 16,109
the weight h1 and h2 are : 16,110
the weight h1 and h2 are : 16,116
the weight h1 and h2 are : 17,6
the weight h1 and h2 are : 17,7
the weight h1 and h2 are : 17,12
the weight h1 and h2 are : 17,23
the weight h1 and h2 are : 17,29
the weight h1 and h2 are : 17,43
the weight h1 and h2 are : 17,58
the weight h1 and h2 are : 17,67
the weight h1 and h2 are : 17,78
the weight h1 and h2 are : 17,83
the weight h1 and h2 are : 17,110
the weight h1 and h2 are : 17,112
the weight h1 and h2 are : 18,3
the weight h1 and h2 are : 18,6
the weight h1 and h2 are : 18,14
the weight h1 and h2 are : 18,29
the weight h1 and h2 are : 18,39
the weight h1 and h2 are : 18,45
the weight h1 and h2 are : 18,55
the weight h1 and h2 are : 18,56
the weight h1 and h2 are : 18,67
the weight h1 and h2 are : 18,78
the weight h1 and h2 are : 18,85
the weight h1 and h2 are : 18,97
the weight h1 and h2 are : 18,116
the weight h1 and h2 are : 19,3
the weight h1 and h2 are : 19,23
the weight h1 and h2 are : 19,53
the weight h1 and h2 are : 19,55
the weight h1 and h2 are : 19,56
the weight h1 and h2 are : 19,78
the weight h1 and h2 are : 19,91
the weight h1 and h2 are : 19,92
the weight h1 and h2 are : 19,93
the weight h1 and h2 are : 19,112
the weight h1 and h2 are : 19,114
the weight h1 and h2 are : 19,118
the weight h1 and h2 are : 20,7
the weight h1 and h2 are : 20,14
the weight h1 and h2 are : 20,53
the weight h1 and h2 are : 20,57
the weight h1 and h2 are : 20,58
the weight h1 and h2 are : 20,65
the weight h1 and h2 are : 20,85
the weight h1 and h2 are : 20,92
the weight h1 and h2 are : 20,101
the weight h1 and h2 are : 20,109
the weight h1 and h2 are : 20,112
the weight h1 and h2 are : 21,3
the weight h1 and h2 are : 21,6
the weight h1 and h2 are : 21,14
the weight h1 and h2 are : 21,29
the weight h1 and h2 are : 21,39
the weight h1 and h2 are : 21,45
the weight h1 and h2 are : 21,55
the weight h1 and h2 are : 21,56
the weight h1 and h2 are : 21,67
```

```
the weight h1 and h2 are : 21,78
the weight h1 and h2 are : 21,85
the weight h1 and h2 are : 21,97
the weight h1 and h2 are : 21,116
the weight h1 and h2 are : 22,7
the weight h1 and h2 are : 22,29
the weight h1 and h2 are : 22,48
the weight h1 and h2 are : 22,56
the weight h1 and h2 are : 22,57
the weight h1 and h2 are : 22,78
the weight h1 and h2 are : 22,83
the weight h1 and h2 are : 22,85
the weight h1 and h2 are : 22,96
the weight h1 and h2 are : 22,97
the weight h1 and h2 are : 22,116
the weight h1 and h2 are : 22,118
the weight h1 and h2 are : 23,3
the weight h1 and h2 are : 23,6
the weight h1 and h2 are : 23,48
the weight h1 and h2 are : 23,56
the weight h1 and h2 are : 23,57
the weight h1 and h2 are : 23,58
the weight h1 and h2 are : 23,83
the weight h1 and h2 are : 23,91
the weight h1 and h2 are : 23,92
the weight h1 and h2 are : 23,96
the weight h1 and h2 are : 23,110
the weight h1 and h2 are : 23,114
the weight h1 and h2 are : 23,116
the weight h1 and h2 are : 24,3
the weight h1 and h2 are : 24,12
the weight h1 and h2 are : 24,46
the weight h1 and h2 are : 24,65
the weight h1 and h2 are : 24,78
the weight h1 and h2 are : 24,83
the weight h1 and h2 are : 24,97
the weight h1 and h2 are : 24,101
the weight h1 and h2 are : 24,106
the weight h1 and h2 are : 24,110
the weight h1 and h2 are : 24,114
the weight h1 and h2 are : 25,6
the weight h1 and h2 are : 25,23
the weight h1 and h2 are : 25,29
the weight h1 and h2 are : 25,46
the weight h1 and h2 are : 25,55
the weight h1 and h2 are : 25,57
the weight h1 and h2 are : 25,83
the weight h1 and h2 are : 25,97
the weight h1 and h2 are : 25,101
the weight h1 and h2 are : 25,106
the weight h1 and h2 are : 25,109
the weight h1 and h2 are : 25,110
the weight h1 and h2 are : 25,112
the weight h1 and h2 are : 25,118
the weight h1 and h2 are : 26,6
the weight h1 and h2 are : 26,14
the weight h1 and h2 are : 26,45
the weight h1 and h2 are : 26,53
the weight h1 and h2 are : 26,57
the weight h1 and h2 are : 26,65
the weight h1 and h2 are : 26,78
the weight h1 and h2 are : 26,85
the weight h1 and h2 are : 26,86
the weight h1 and h2 are : 26,92
the weight h1 and h2 are : 26,96
the weight h1 and h2 are : 26,106
```

```
the weight h1 and h2 are : 26,109
the weight h1 and h2 are : 26,110
the weight h1 and h2 are : 27,14
the weight h1 and h2 are : 27,23
the weight h1 and h2 are : 27,29
the weight h1 and h2 are : 27,39
the weight h1 and h2 are : 27,43
the weight h1 and h2 are : 27,57
the weight h1 and h2 are : 27,67
the weight h1 and h2 are : 27,86
the weight h1 and h2 are : 27,92
the weight h1 and h2 are : 27,93
the weight h1 and h2 are : 27,97
the weight h1 and h2 are : 27,112
the weight h1 and h2 are : 28,3
the weight h1 and h2 are : 28,12
the weight h1 and h2 are : 28,46
the weight h1 and h2 are : 28,65
the weight h1 and h2 are : 28,78
the weight h1 and h2 are : 28,83
the weight h1 and h2 are : 28,97
the weight h1 and h2 are : 28,101
the weight h1 and h2 are : 28,106
the weight h1 and h2 are : 28,110
the weight h1 and h2 are : 28,114
the weight h1 and h2 are : 29,3
the weight h1 and h2 are : 29,6
the weight h1 and h2 are : 29,7
the weight h1 and h2 are : 29,12
the weight h1 and h2 are : 29,14
the weight h1 and h2 are : 29,43
the weight h1 and h2 are : 29,45
the weight h1 and h2 are : 29,46
the weight h1 and h2 are : 29,48
the weight h1 and h2 are : 29,83
the weight h1 and h2 are : 29,93
the weight h1 and h2 are : 29,97
the weight h1 and h2 are : 29,109
the weight h1 and h2 are : 29,112
the weight h1 and h2 are : 30,3
the weight h1 and h2 are : 30,7
the weight h1 and h2 are : 30,12
the weight h1 and h2 are : 30,39
the weight h1 and h2 are : 30,43
the weight h1 and h2 are : 30,46
the weight h1 and h2 are : 30,48
the weight h1 and h2 are : 30,53
the weight h1 and h2 are : 30,55
the weight h1 and h2 are : 30,86
the weight h1 and h2 are : 30,92
the weight h1 and h2 are : 30,96
the weight h1 and h2 are : 30,106
the weight h1 and h2 are : 30,118
the weight h1 and h2 are : 31,3
the weight h1 and h2 are : 31,12
the weight h1 and h2 are : 31,29
the weight h1 and h2 are : 31,43
the weight h1 and h2 are : 31,45
the weight h1 and h2 are : 31,48
the weight h1 and h2 are : 31,57
the weight h1 and h2 are : 31,65
the weight h1 and h2 are : 31,85
the weight h1 and h2 are : 31,91
the weight h1 and h2 are : 31,93
the weight h1 and h2 are : 31,106
the weight h1 and h2 are : 31,114
```

```
the weight h1 and h2 are : 32,7
the weight h1 and h2 are : 32,14
the weight h1 and h2 are : 32,29
the weight h1 and h2 are : 32,46
the weight h1 and h2 are : 32,48
the weight h1 and h2 are : 32,55
the weight h1 and h2 are : 32,57
the weight h1 and h2 are : 32,86
the weight h1 and h2 are : 32,91
the weight h1 and h2 are : 32,110
the weight h1 and h2 are : 32,114
the weight h1 and h2 are : 32,118
the weight h1 and h2 are : 33,3
the weight h1 and h2 are : 33,14
the weight h1 and h2 are : 33,23
the weight h1 and h2 are : 33,43
the weight h1 and h2 are : 33,53
the weight h1 and h2 are : 33,56
the weight h1 and h2 are : 33,57
the weight h1 and h2 are : 33,83
the weight h1 and h2 are : 33,91
the weight h1 and h2 are : 33,97
the weight h1 and h2 are : 33,106
the weight h1 and h2 are : 33,114
the weight h1 and h2 are : 33,116
the weight h1 and h2 are : 34,3
the weight h1 and h2 are : 34,7
the weight h1 and h2 are : 34,39
the weight h1 and h2 are : 34,58
the weight h1 and h2 are : 34,65
the weight h1 and h2 are : 34,78
the weight h1 and h2 are : 34,83
the weight h1 and h2 are : 34,86
the weight h1 and h2 are : 34,91
the weight h1 and h2 are : 34,97
the weight h1 and h2 are : 34,101
the weight h1 and h2 are : 34,106
the weight h1 and h2 are : 34,112
the weight h1 and h2 are : 34,116
the weight h1 and h2 are : 35,3
the weight h1 and h2 are : 35,7
the weight h1 and h2 are : 35,12
the weight h1 and h2 are : 35,39
the weight h1 and h2 are : 35,43
the weight h1 and h2 are : 35,46
the weight h1 and h2 are : 35,48
the weight h1 and h2 are : 35,53
the weight h1 and h2 are : 35,55
the weight h1 and h2 are : 35,86
the weight h1 and h2 are : 35,92
the weight h1 and h2 are : 35,96
the weight h1 and h2 are : 35,106
the weight h1 and h2 are : 35,118
the weight h1 and h2 are : 36,14
the weight h1 and h2 are : 36,29
the weight h1 and h2 are : 36,39
the weight h1 and h2 are : 36,43
the weight h1 and h2 are : 36,53
the weight h1 and h2 are : 36,56
the weight h1 and h2 are : 36,58
the weight h1 and h2 are : 36,65
the weight h1 and h2 are : 36,67
the weight h1 and h2 are : 36,83
the weight h1 and h2 are : 36,96
the weight h1 and h2 are : 36,109
the weight h1 and h2 are : 36,112
```

```
the weight h1 and h2 are : 36,114
the weight h1 and h2 are : 37,7
the weight h1 and h2 are : 37,29
the weight h1 and h2 are : 37,48
the weight h1 and h2 are : 37,56
the weight h1 and h2 are : 37,57
the weight h1 and h2 are : 37,78
the weight h1 and h2 are : 37,83
the weight h1 and h2 are : 37,85
the weight h1 and h2 are : 37,96
the weight h1 and h2 are : 37,97
the weight h1 and h2 are : 37,116
the weight h1 and h2 are : 37,118
the weight h1 and h2 are : 38,14
the weight h1 and h2 are : 38,23
the weight h1 and h2 are : 38,45
the weight h1 and h2 are : 38,55
the weight h1 and h2 are : 38,58
the weight h1 and h2 are : 38,83
the weight h1 and h2 are : 38,92
the weight h1 and h2 are : 38,93
the weight h1 and h2 are : 38,96
the weight h1 and h2 are : 38,101
the weight h1 and h2 are : 38,109
the weight h1 and h2 are : 38,110
the weight h1 and h2 are : 38,114
the weight h1 and h2 are : 38,118
the weight h1 and h2 are : 39,6
the weight h1 and h2 are : 39,14
the weight h1 and h2 are : 39,48
the weight h1 and h2 are : 39,53
the weight h1 and h2 are : 39,55
the weight h1 and h2 are : 39,58
the weight h1 and h2 are : 39,65
the weight h1 and h2 are : 39,85
the weight h1 and h2 are : 39,91
the weight h1 and h2 are : 39,93
the weight h1 and h2 are : 39,96
the weight h1 and h2 are : 39,97
the weight h1 and h2 are : 39,101
the weight h1 and h2 are : 39,112
the weight h1 and h2 are : 40,7
the weight h1 and h2 are : 40,23
the weight h1 and h2 are : 40,45
the weight h1 and h2 are : 40,46
the weight h1 and h2 are : 40,48
the weight h1 and h2 are : 40,53
the weight h1 and h2 are : 40,57
the weight h1 and h2 are : 40,58
the weight h1 and h2 are : 40,67
the weight h1 and h2 are : 40,78
the weight h1 and h2 are : 40,86
the weight h1 and h2 are : 40,97
the weight h1 and h2 are : 40,114
the weight h1 and h2 are : 41,6
the weight h1 and h2 are : 41,7
the weight h1 and h2 are : 41,12
the weight h1 and h2 are : 41,23
the weight h1 and h2 are : 41,29
the weight h1 and h2 are : 41,43
the weight h1 and h2 are : 41,58
the weight h1 and h2 are : 41,67
the weight h1 and h2 are : 41,78
the weight h1 and h2 are : 41,83
the weight h1 and h2 are : 41,110
the weight h1 and h2 are : 41,112
```

```
                                   are
   the weight h1 and h2 a   : 42,14
   the weight h1 and h2 are : 42,29
   the weight h1 and h2 are : 42,39
   the weight h1 and h2 are : 42,43
   the weight h1 and h2 are : 42,53
   the weight h1 and h2 are : 42,56
   the weight h1 and h2 are : 42,58
   the weight h1 and h2 are : 42,65
   the weight h1 and h2 are : 42,67
   the weight h1 and h2 are : 42,83
   the weight h1 and h2 are : 42,96
   the weight h1 and h2 are : 42,109
   the weight h1 and h2 are : 42,112
   the weight h1 and h2 are : 42,114
   the weight h1 and h2 are : 43,3
   the weight h1 and h2 are : 43,6
   the weight h1 and h2 are : 43,7
   the weight h1 and h2 are : 43,12
   the weight h1 and h2 are : 43,14
   the weight h1 and h2 are : 43,43
   the weight h1 and h2 are : 43,45
   the weight h1 and h2 are : 43,46
   the weight h1 and h2 are : 43,48
   the weight h1 and h2 are : 43,83
   the weight h1 and h2 are : 43,93
   the weight h1 and h2 are : 43,97
   the weight h1 and h2 are : 43,109
   the weight h1 and h2 are : 43,112
   the weight h1 and h2 are : 44,7
   the weight h1 and h2 are : 44,12
   the weight h1 and h2 are : 44,14
   the weight h1 and h2 are : 44,29
   the weight h1 and h2 are : 44,39
   the weight h1 and h2 are : 44,46
   the weight h1 and h2 are : 44,53
   the weight h1 and h2 are : 44,56
   the weight h1 and h2 are : 44,58
   the weight h1 and h2 are : 44,83
   the weight h1 and h2 are : 44,86
   the weight h1 and h2 are : 44,93
   the weight h1 and h2 are : 44,97
   the weight h1 and h2 are : 44,116
   the weight h1 and h2 are : 45,3
   the weight h1 and h2 are : 45,7
   the weight h1 and h2 are : 45,14
   the weight h1 and h2 are : 45,29
   the weight h1 and h2 are : 45,48
   the weight h1 and h2 are : 45,56
   the weight h1 and h2 are : 45,91
   the weight h1 and h2 are : 45,96
   the weight h1 and h2 are : 45,106
   the weight h1 and h2 are : 45,109
   the weight h1 and h2 are : 45,110
   the weight h1 and h2 are : 45,112
   the weight h1 and h2 are : 45,114
   the weight h1 and h2 are : 46,12
   the weight h1 and h2 are : 46,14
   the weight h1 and h2 are : 46,23
   the weight h1 and h2 are : 46,29
   the weight h1 and h2 are : 46,46
   the weight h1 and h2 are : 46,65
   the weight h1 and h2 are : 46,78
   the weight h1 and h2 are : 46,86
   the weight h1 and h2 are : 46,91
   the weight h1 and h2 are : 46,92
   the weight h1 and h2 are : 46,96
```

```
the weight h1 and h2 are : 46,114
the weight h1 and h2 are : 46,116
the weight h1 and h2 are : 46,118
the weight h1 and h2 are : 47,7
the weight h1 and h2 are : 47,23
the weight h1 and h2 are : 47,43
the weight h1 and h2 are : 47,55
the weight h1 and h2 are : 47,57
the weight h1 and h2 are : 47,67
the weight h1 and h2 are : 47,78
the weight h1 and h2 are : 47,91
the weight h1 and h2 are : 47,92
the weight h1 and h2 are : 47,93
the weight h1 and h2 are : 47,101
the weight h1 and h2 are : 47,109
the weight h1 and h2 are : 47,116
the weight h1 and h2 are : 48,3
the weight h1 and h2 are : 48,6
the weight h1 and h2 are : 48,48
the weight h1 and h2 are : 48,56
the weight h1 and h2 are : 48,57
the weight h1 and h2 are : 48,58
the weight h1 and h2 are : 48,83
the weight h1 and h2 are : 48,91
the weight h1 and h2 are : 48,92
the weight h1 and h2 are : 48,96
the weight h1 and h2 are : 48,110
the weight h1 and h2 are : 48,114
the weight h1 and h2 are : 48,116
the weight h1 and h2 are : 49,14
the weight h1 and h2 are : 49,29
the weight h1 and h2 are : 49,39
the weight h1 and h2 are : 49,43
the weight h1 and h2 are : 49,53
the weight h1 and h2 are : 49,56
the weight h1 and h2 are : 49,58
the weight h1 and h2 are : 49,65
the weight h1 and h2 are : 49,67
the weight h1 and h2 are : 49,83
the weight h1 and h2 are : 49,96
the weight h1 and h2 are : 49,109
the weight h1 and h2 are : 49,112
the weight h1 and h2 are : 49,114
the weight h1 and h2 are : 50,39
the weight h1 and h2 are : 50,46
the weight h1 and h2 are : 50,56
the weight h1 and h2 are : 50,57
the weight h1 and h2 are : 50,65
the weight h1 and h2 are : 50,91
the weight h1 and h2 are : 50,93
the weight h1 and h2 are : 50,101
the weight h1 and h2 are : 50,109
the weight h1 and h2 are : 50,110
the weight h1 and h2 are : 50,116
the weight h1 and h2 are : 51,7
the weight h1 and h2 are : 51,12
the weight h1 and h2 are : 51,43
the weight h1 and h2 are : 51,45
the weight h1 and h2 are : 51,46
the weight h1 and h2 are : 51,56
the weight h1 and h2 are : 51,78
the weight h1 and h2 are : 51,83
the weight h1 and h2 are : 51,85
the weight h1 and h2 are : 51,92
the weight h1 and h2 are : 51,97
the weight h1 and h2 are : 51,101
```

```
the weight h1 and h2 are : 51,110
the weight h1 and h2 are : 51,112
the weight h1 and h2 are : 52,6
the weight h1 and h2 are : 52,23
the weight h1 and h2 are : 52,43
the weight h1 and h2 are : 52,45
the weight h1 and h2 are : 52,46
the weight h1 and h2 are : 52,48
the weight h1 and h2 are : 52,53
the weight h1 and h2 are : 52,65
the weight h1 and h2 are : 52,67
the weight h1 and h2 are : 52,83
the weight h1 and h2 are : 52,85
the weight h1 and h2 are : 52,91
the weight h1 and h2 are : 53,3
the weight h1 and h2 are : 53,6
the weight h1 and h2 are : 53,7
the weight h1 and h2 are : 53,23
the weight h1 and h2 are : 53,56
the weight h1 and h2 are : 53,65
the weight h1 and h2 are : 53,67
the weight h1 and h2 are : 53,85
the weight h1 and h2 are : 53,86
the weight h1 and h2 are : 53,93
the weight h1 and h2 are : 53,110
the weight h1 and h2 are : 53,112
the weight h1 and h2 are : 53,118
the weight h1 and h2 are : 54,6
the weight h1 and h2 are : 54,23
the weight h1 and h2 are : 54,39
the weight h1 and h2 are : 54,46
the weight h1 and h2 are : 54,55
the weight h1 and h2 are : 54,56
the weight h1 and h2 are : 54,67
the weight h1 and h2 are : 54,85
the weight h1 and h2 are : 54,86
the weight h1 and h2 are : 54,101
the weight h1 and h2 are : 54,106
the weight h1 and h2 are : 54,112
the weight h1 and h2 are : 54,114
the weight h1 and h2 are : 55,3
the weight h1 and h2 are : 55,6
the weight h1 and h2 are : 55,7
the weight h1 and h2 are : 55,12
the weight h1 and h2 are : 55,14
the weight h1 and h2 are : 55,43
the weight h1 and h2 are : 55,45
the weight h1 and h2 are : 55,46
the weight h1 and h2 are : 55,48
the weight h1 and h2 are : 55,83
the weight h1 and h2 are : 55,93
the weight h1 and h2 are : 55,97
the weight h1 and h2 are : 55,109
the weight h1 and h2 are : 55,112
the weight h1 and h2 are : 56,3
the weight h1 and h2 are : 56,6
the weight h1 and h2 are : 56,48
the weight h1 and h2 are : 56,56
the weight h1 and h2 are : 56,57
the weight h1 and h2 are : 56,58
the weight h1 and h2 are : 56,83
the weight h1 and h2 are : 56,91
the weight h1 and h2 are : 56,92
the weight h1 and h2 are : 56,96
the weight h1 and h2 are : 56,110
the weight h1 and h2 are : 56,114
``` the weight h1 and h2 are : 56,116
the weight h1 and h2 are : 57,6
the weight h1 and h2 are : 57,12
the weight h1 and h2 are : 57,23
the weight h1 and h2 are : 57,39
the weight h1 and h2 are : 57,53
the weight h1 and h2 are : 57,55
the weight h1 and h2 are : 57,57
the weight h1 and h2 are : 57,65
the weight h1 and h2 are : 57,93
the weight h1 and h2 are : 57,96
the weight h1 and h2 are : 57,101
the weight h1 and h2 are : 57,112
the weight h1 and h2 are : 57,114
the weight h1 and h2 are : 57,116
the weight h1 and h2 are : 58,3
the weight h1 and h2 are : 58,12
the weight h1 and h2 are : 58,43
the weight h1 and h2 are : 58,55
the weight h1 and h2 are : 58,56
the weight h1 and h2 are : 58,65
the weight h1 and h2 are : 58,67
the weight h1 and h2 are : 58,96
the weight h1 and h2 are : 58,97
the weight h1 and h2 are : 58,106
the weight h1 and h2 are : 58,110
the weight h1 and h2 are : 58,116
the weight h1 and h2 are : 59,6
the weight h1 and h2 are : 59,12
the weight h1 and h2 are : 59,14
the weight h1 and h2 are : 59,39
the weight h1 and h2 are : 59,67
the weight h1 and h2 are : 59,86
the weight h1 and h2 are : 59,91
the weight h1 and h2 are : 59,92
the weight h1 and h2 are : 59,96
the weight h1 and h2 are : 59,97
the weight h1 and h2 are : 59,118
the weight h1 and h2 are : 60,3
the weight h1 and h2 are : 60,12
the weight h1 and h2 are : 60,23
the weight h1 and h2 are : 60,45
the weight h1 and h2 are : 60,85
the weight h1 and h2 are : 60,86
the weight h1 and h2 are : 60,93
the weight h1 and h2 are : 60,96
the weight h1 and h2 are : 60,97
the weight h1 and h2 are : 60,106
the weight h1 and h2 are : 60,109
the weight h1 and h2 are : 61,39
the weight h1 and h2 are : 61,46
the weight h1 and h2 are : 61,56
the weight h1 and h2 are : 61,57
the weight h1 and h2 are : 61,65
the weight h1 and h2 are : 61,91
the weight h1 and h2 are : 61,93
the weight h1 and h2 are : 61,101
the weight h1 and h2 are : 61,109
the weight h1 and h2 are : 61,110
the weight h1 and h2 are : 61,116
the weight h1 and h2 are : 62,3
the weight h1 and h2 are : 62,7
the weight h1 and h2 are : 62,12
the weight h1 and h2 are : 62,39
the weight h1 and h2 are : 62,43
the weight h1 and h2 are : 62,46

```
the weight h1 and h2 are : 62,48
the weight h1 and h2 are : 62,53
the weight h1 and h2 are : 62,55
the weight h1 and h2 are : 62,86
the weight h1 and h2 are : 62,92
the weight h1 and h2 are : 62,96
the weight h1 and h2 are : 62,106
the weight h1 and h2 are : 62,118
the weight h1 and h2 are : 63,6
the weight h1 and h2 are : 63,23
the weight h1 and h2 are : 63,39
the weight h1 and h2 are : 63,46
the weight h1 and h2 are : 63,55
the weight h1 and h2 are : 63,56
the weight h1 and h2 are : 63,67
the weight h1 and h2 are : 63,85
the weight h1 and h2 are : 63,86
the weight h1 and h2 are : 63,101
the weight h1 and h2 are : 63,106
the weight h1 and h2 are : 63,112
the weight h1 and h2 are : 63,114
the weight h1 and h2 are : 64,12
the weight h1 and h2 are : 64,39
the weight h1 and h2 are : 64,46
the weight h1 and h2 are : 64,58
the weight h1 and h2 are : 64,67
the weight h1 and h2 are : 64,85
the weight h1 and h2 are : 64,91
the weight h1 and h2 are : 64,92
the weight h1 and h2 are : 64,93
the weight h1 and h2 are : 64,97
the weight h1 and h2 are : 64,109
the weight h1 and h2 are : 64,110
the weight h1 and h2 are : 64,114
the weight h1 and h2 are : 64,118
the weight h1 and h2 are : 65,3
the weight h1 and h2 are : 65,6
the weight h1 and h2 are : 65,23
the weight h1 and h2 are : 65,29
the weight h1 and h2 are : 65,39
the weight h1 and h2 are : 65,48
the weight h1 and h2 are : 65,67
the weight h1 and h2 are : 65,83
the weight h1 and h2 are : 65,85
the weight h1 and h2 are : 65,92
the weight h1 and h2 are : 65,93
the weight h1 and h2 are : 65,101
the weight h1 and h2 are : 65,118
the weight h1 and h2 are : 66,7
the weight h1 and h2 are : 66,14
the weight h1 and h2 are : 66,29
the weight h1 and h2 are : 66,45
the weight h1 and h2 are : 66,46
the weight h1 and h2 are : 66,56
the weight h1 and h2 are : 66,67
the weight h1 and h2 are : 66,92
the weight h1 and h2 are : 66,96
the weight h1 and h2 are : 66,101
the weight h1 and h2 are : 66,106
the weight h1 and h2 are : 66,114
the weight h1 and h2 are : 66,116
the weight h1 and h2 are : 66,118
the weight h1 and h2 are : 67,6
the weight h1 and h2 are : 67,12
the weight h1 and h2 are : 67,23
the weight h1 and h2 are : 67,39
``` the weight h1 and h2 are : 67,53
the weight h1 and h2 are : 67,55
the weight h1 and h2 are : 67,57
the weight h1 and h2 are : 67,65
the weight h1 and h2 are : 67,93
the weight h1 and h2 are : 67,96
the weight h1 and h2 are : 67,101
the weight h1 and h2 are : 67,112
the weight h1 and h2 are : 67,114
the weight h1 and h2 are : 67,116
the weight h1 and h2 are : 68,7
the weight h1 and h2 are : 68,29
the weight h1 and h2 are : 68,48
the weight h1 and h2 are : 68,56
the weight h1 and h2 are : 68,57
the weight h1 and h2 are : 68,78
the weight h1 and h2 are : 68,83
the weight h1 and h2 are : 68,85
the weight h1 and h2 are : 68,96
the weight h1 and h2 are : 68,97
the weight h1 and h2 are : 68,116
the weight h1 and h2 are : 68,118
the weight h1 and h2 are : 69,6
the weight h1 and h2 are : 69,7
the weight h1 and h2 are : 69,12
the weight h1 and h2 are : 69,23
the weight h1 and h2 are : 69,29
the weight h1 and h2 are : 69,43
the weight h1 and h2 are : 69,58
the weight h1 and h2 are : 69,67
the weight h1 and h2 are : 69,78
the weight h1 and h2 are : 69,83
the weight h1 and h2 are : 69,110
the weight h1 and h2 are : 69,112
the weight h1 and h2 are : 70,3
the weight h1 and h2 are : 70,12
the weight h1 and h2 are : 70,23
the weight h1 and h2 are : 70,45
the weight h1 and h2 are : 70,85
the weight h1 and h2 are : 70,86
the weight h1 and h2 are : 70,93
the weight h1 and h2 are : 70,96
the weight h1 and h2 are : 70,97
the weight h1 and h2 are : 70,106
the weight h1 and h2 are : 70,109
the weight h1 and h2 are : 71,6
the weight h1 and h2 are : 71,12
the weight h1 and h2 are : 71,43
the weight h1 and h2 are : 71,45
the weight h1 and h2 are : 71,48
the weight h1 and h2 are : 71,53
the weight h1 and h2 are : 71,65
the weight h1 and h2 are : 71,86
the weight h1 and h2 are : 71,101
the weight h1 and h2 are : 71,106
the weight h1 and h2 are : 71,110
the weight h1 and h2 are : 71,112
the weight h1 and h2 are : 71,116
the weight h1 and h2 are : 71,118
the weight h1 and h2 are : 72,14
the weight h1 and h2 are : 72,39
the weight h1 and h2 are : 72,45
the weight h1 and h2 are : 72,48
the weight h1 and h2 are : 72,58
the weight h1 and h2 are : 72,67
the weight h1 and h2 are : 72,78

```
the weight h1 and h2 are : 72,92
the weight h1 and h2 are : 72,106
the weight h1 and h2 are : 72,112
the weight h1 and h2 are : 72,116
the weight h1 and h2 are : 73,12
the weight h1 and h2 are : 73,39
the weight h1 and h2 are : 73,46
the weight h1 and h2 are : 73,58
the weight h1 and h2 are : 73,67
the weight h1 and h2 are : 73,85
the weight h1 and h2 are : 73,91
the weight h1 and h2 are : 73,92
the weight h1 and h2 are : 73,93
the weight h1 and h2 are : 73,97
the weight h1 and h2 are : 73,109
the weight h1 and h2 are : 73,110
the weight h1 and h2 are : 73,114
the weight h1 and h2 are : 73,118
the weight h1 and h2 are : 74,7
the weight h1 and h2 are : 74,12
the weight h1 and h2 are : 74,14
the weight h1 and h2 are : 74,29
the weight h1 and h2 are : 74,39
the weight h1 and h2 are : 74,46
the weight h1 and h2 are : 74,53
the weight h1 and h2 are : 74,56
the weight h1 and h2 are : 74,58
the weight h1 and h2 are : 74,83
the weight h1 and h2 are : 74,86
the weight h1 and h2 are : 74,93
the weight h1 and h2 are : 74,97
the weight h1 and h2 are : 74,116
the weight h1 and h2 are : 75,3
the weight h1 and h2 are : 75,12
the weight h1 and h2 are : 75,46
the weight h1 and h2 are : 75,65
the weight h1 and h2 are : 75,78
the weight h1 and h2 are : 75,83
the weight h1 and h2 are : 75,97
the weight h1 and h2 are : 75,101
the weight h1 and h2 are : 75,106
the weight h1 and h2 are : 75,110
the weight h1 and h2 are : 75,114
the weight h1 and h2 are : 76,7
the weight h1 and h2 are : 76,23
the weight h1 and h2 are : 76,43
the weight h1 and h2 are : 76,55
the weight h1 and h2 are : 76,57
the weight h1 and h2 are : 76,67
the weight h1 and h2 are : 76,78
the weight h1 and h2 are : 76,91
the weight h1 and h2 are : 76,92
the weight h1 and h2 are : 76,93
the weight h1 and h2 are : 76,101
the weight h1 and h2 are : 76,109
the weight h1 and h2 are : 76,116
the weight h1 and h2 are : 77,7
the weight h1 and h2 are : 77,14
the weight h1 and h2 are : 77,29
the weight h1 and h2 are : 77,45
the weight h1 and h2 are : 77,46
the weight h1 and h2 are : 77,56
the weight h1 and h2 are : 77,67
the weight h1 and h2 are : 77,92
the weight h1 and h2 are : 77,96
the weight h1 and h2 are : 77,101
```

```
the weight h1 and h2 are : 77,106
the weight h1 and h2 are : 77,114
the weight h1 and h2 are : 77,116
the weight h1 and h2 are : 77,118
the weight h1 and h2 are : 78,7
the weight h1 and h2 are : 78,12
the weight h1 and h2 are : 78,45
the weight h1 and h2 are : 78,48
the weight h1 and h2 are : 78,53
the weight h1 and h2 are : 78,55
the weight h1 and h2 are : 78,56
the weight h1 and h2 are : 78,57
the weight h1 and h2 are : 78,65
the weight h1 and h2 are : 78,67
the weight h1 and h2 are : 78,78
the weight h1 and h2 are : 78,109
the weight h1 and h2 are : 78,118
the weight h1 and h2 are : 79,6
the weight h1 and h2 are : 79,12
the weight h1 and h2 are : 79,43
the weight h1 and h2 are : 79,45
the weight h1 and h2 are : 79,48
the weight h1 and h2 are : 79,53
the weight h1 and h2 are : 79,65
the weight h1 and h2 are : 79,86
the weight h1 and h2 are : 79,101
the weight h1 and h2 are : 79,106
the weight h1 and h2 are : 79,110
the weight h1 and h2 are : 79,112
the weight h1 and h2 are : 79,116
the weight h1 and h2 are : 79,118
the weight h1 and h2 are : 80,7
the weight h1 and h2 are : 80,12
the weight h1 and h2 are : 80,43
the weight h1 and h2 are : 80,45
the weight h1 and h2 are : 80,46
the weight h1 and h2 are : 80,56
the weight h1 and h2 are : 80,78
the weight h1 and h2 are : 80,83
the weight h1 and h2 are : 80,85
the weight h1 and h2 are : 80,92
the weight h1 and h2 are : 80,97
the weight h1 and h2 are : 80,101
the weight h1 and h2 are : 80,110
the weight h1 and h2 are : 80,112
the weight h1 and h2 are : 81,3
the weight h1 and h2 are : 81,12
the weight h1 and h2 are : 81,29
the weight h1 and h2 are : 81,43
the weight h1 and h2 are : 81,45
the weight h1 and h2 are : 81,48
the weight h1 and h2 are : 81,57
the weight h1 and h2 are : 81,65
the weight h1 and h2 are : 81,85
the weight h1 and h2 are : 81,91
the weight h1 and h2 are : 81,93
the weight h1 and h2 are : 81,106
the weight h1 and h2 are : 81,114
the weight h1 and h2 are : 82,3
the weight h1 and h2 are : 82,7
the weight h1 and h2 are : 82,39
the weight h1 and h2 are : 82,58
the weight h1 and h2 are : 82,65
the weight h1 and h2 are : 82,78
the weight h1 and h2 are : 82,83
the weight h1 and h2 are : 82,86
```

```
the weight h1 and h2 are : 82,91
the weight h1 and h2 are : 82,97
the weight h1 and h2 are : 82,101
the weight h1 and h2 are : 82,106
the weight h1 and h2 are : 82,112
the weight h1 and h2 are : 82,116
the weight h1 and h2 are : 83,3
the weight h1 and h2 are : 83,6
the weight h1 and h2 are : 83,7
the weight h1 and h2 are : 83,23
the weight h1 and h2 are : 83,56
the weight h1 and h2 are : 83,65
the weight h1 and h2 are : 83,67
the weight h1 and h2 are : 83,85
the weight h1 and h2 are : 83,86
the weight h1 and h2 are : 83,93
the weight h1 and h2 are : 83,110
the weight h1 and h2 are : 83,112
the weight h1 and h2 are : 83,118
the weight h1 and h2 are : 84,14
the weight h1 and h2 are : 84,39
the weight h1 and h2 are : 84,45
the weight h1 and h2 are : 84,48
the weight h1 and h2 are : 84,58
the weight h1 and h2 are : 84,67
the weight h1 and h2 are : 84,78
the weight h1 and h2 are : 84,92
the weight h1 and h2 are : 84,106
the weight h1 and h2 are : 84,112
the weight h1 and h2 are : 84,116
the weight h1 and h2 are : 85,7
the weight h1 and h2 are : 85,12
the weight h1 and h2 are : 85,45
the weight h1 and h2 are : 85,48
the weight h1 and h2 are : 85,53
the weight h1 and h2 are : 85,55
the weight h1 and h2 are : 85,56
the weight h1 and h2 are : 85,57
the weight h1 and h2 are : 85,65
the weight h1 and h2 are : 85,67
the weight h1 and h2 are : 85,78
the weight h1 and h2 are : 85,109
the weight h1 and h2 are : 85,118
the weight h1 and h2 are : 86,3
the weight h1 and h2 are : 86,12
the weight h1 and h2 are : 86,43
the weight h1 and h2 are : 86,55
the weight h1 and h2 are : 86,56
the weight h1 and h2 are : 86,65
the weight h1 and h2 are : 86,67
the weight h1 and h2 are : 86,96
the weight h1 and h2 are : 86,97
the weight h1 and h2 are : 86,106
the weight h1 and h2 are : 86,110
the weight h1 and h2 are : 86,116
the weight h1 and h2 are : 87,14
the weight h1 and h2 are : 87,23
the weight h1 and h2 are : 87,45
the weight h1 and h2 are : 87,55
the weight h1 and h2 are : 87,58
the weight h1 and h2 are : 87,83
the weight h1 and h2 are : 87,92
the weight h1 and h2 are : 87,93
the weight h1 and h2 are : 87,96
the weight h1 and h2 are : 87,101
the weight h1 and h2 are : 87,109
```

```
the weight h1 and h2 are : 87,110
the weight h1 and h2 are : 87,114
the weight h1 and h2 are : 87,118
the weight h1 and h2 are : 88,3
the weight h1 and h2 are : 88,6
the weight h1 and h2 are : 88,14
the weight h1 and h2 are : 88,29
the weight h1 and h2 are : 88,39
the weight h1 and h2 are : 88,45
the weight h1 and h2 are : 88,55
the weight h1 and h2 are : 88,56
the weight h1 and h2 are : 88,67
the weight h1 and h2 are : 88,78
the weight h1 and h2 are : 88,85
the weight h1 and h2 are : 88,97
the weight h1 and h2 are : 88,116
the weight h1 and h2 are : 89,7
the weight h1 and h2 are : 89,23
the weight h1 and h2 are : 89,45
the weight h1 and h2 are : 89,46
the weight h1 and h2 are : 89,48
the weight h1 and h2 are : 89,53
the weight h1 and h2 are : 89,57
the weight h1 and h2 are : 89,58
the weight h1 and h2 are : 89,67
the weight h1 and h2 are : 89,78
the weight h1 and h2 are : 89,86
the weight h1 and h2 are : 89,97
the weight h1 and h2 are : 89,114
the weight h1 and h2 are : 90,6
the weight h1 and h2 are : 90,12
the weight h1 and h2 are : 90,14
the weight h1 and h2 are : 90,39
the weight h1 and h2 are : 90,67
the weight h1 and h2 are : 90,86
the weight h1 and h2 are : 90,91
the weight h1 and h2 are : 90,92
the weight h1 and h2 are : 90,96
the weight h1 and h2 are : 90,97
the weight h1 and h2 are : 90,118
the weight h1 and h2 are : 91,7
the weight h1 and h2 are : 91,12
the weight h1 and h2 are : 91,45
the weight h1 and h2 are : 91,48
the weight h1 and h2 are : 91,53
the weight h1 and h2 are : 91,55
the weight h1 and h2 are : 91,56
the weight h1 and h2 are : 91,57
the weight h1 and h2 are : 91,65
the weight h1 and h2 are : 91,67
the weight h1 and h2 are : 91,78
the weight h1 and h2 are : 91,109
the weight h1 and h2 are : 91,118
the weight h1 and h2 are : 92,3
the weight h1 and h2 are : 92,6
the weight h1 and h2 are : 92,23
the weight h1 and h2 are : 92,29
the weight h1 and h2 are : 92,39
the weight h1 and h2 are : 92,48
the weight h1 and h2 are : 92,67
the weight h1 and h2 are : 92,83
the weight h1 and h2 are : 92,85
the weight h1 and h2 are : 92,92
the weight h1 and h2 are : 92,93
the weight h1 and h2 are : 92,101
the weight h1 and h2 are : 92,118
```

```
the weight h1 and h2 are : 93,3
the weight h1 and h2 are : 93,7
the weight h1 and h2 are : 93,14
the weight h1 and h2 are : 93,29
the weight h1 and h2 are : 93,48
the weight h1 and h2 are : 93,56
the weight h1 and h2 are : 93,91
the weight h1 and h2 are : 93,96
the weight h1 and h2 are : 93,106
the weight h1 and h2 are : 93,109
the weight h1 and h2 are : 93,110
the weight h1 and h2 are : 93,112
the weight h1 and h2 are : 93,114
the weight h1 and h2 are : 94,6
the weight h1 and h2 are : 94,23
the weight h1 and h2 are : 94,29
the weight h1 and h2 are : 94,46
the weight h1 and h2 are : 94,55
the weight h1 and h2 are : 94,57
the weight h1 and h2 are : 94,83
the weight h1 and h2 are : 94,97
the weight h1 and h2 are : 94,101
the weight h1 and h2 are : 94,106
the weight h1 and h2 are : 94,109
the weight h1 and h2 are : 94,110
the weight h1 and h2 are : 94,112
the weight h1 and h2 are : 94,118
the weight h1 and h2 are : 95,14
the weight h1 and h2 are : 95,23
the weight h1 and h2 are : 95,29
the weight h1 and h2 are : 95,39
the weight h1 and h2 are : 95,43
the weight h1 and h2 are : 95,57
the weight h1 and h2 are : 95,67
the weight h1 and h2 are : 95,86
the weight h1 and h2 are : 95,92
the weight h1 and h2 are : 95,93
the weight h1 and h2 are : 95,97
the weight h1 and h2 are : 95,112
the weight h1 and h2 are : 96,12
the weight h1 and h2 are : 96,14
the weight h1 and h2 are : 96,23
the weight h1 and h2 are : 96,29
the weight h1 and h2 are : 96,46
the weight h1 and h2 are : 96,65
the weight h1 and h2 are : 96,78
the weight h1 and h2 are : 96,86
the weight h1 and h2 are : 96,91
the weight h1 and h2 are : 96,92
the weight h1 and h2 are : 96,96
the weight h1 and h2 are : 96,114
the weight h1 and h2 are : 96,116
the weight h1 and h2 are : 96,118
the weight h1 and h2 are : 97,3
the weight h1 and h2 are : 97,6
the weight h1 and h2 are : 97,23
the weight h1 and h2 are : 97,29
the weight h1 and h2 are : 97,39
the weight h1 and h2 are : 97,48
the weight h1 and h2 are : 97,67
the weight h1 and h2 are : 97,83
the weight h1 and h2 are : 97,85
the weight h1 and h2 are : 97,92
the weight h1 and h2 are : 97,93
the weight h1 and h2 are : 97,101
the weight h1 and h2 are : 97,118
```

```
the weight h1 and h2 are : 98,14
the weight h1 and h2 are : 98,39
the weight h1 and h2 are : 98,45
the weight h1 and h2 are : 98,48
the weight h1 and h2 are : 98,58
the weight h1 and h2 are : 98,67
the weight h1 and h2 are : 98,78
the weight h1 and h2 are : 98,92
the weight h1 and h2 are : 98,106
the weight h1 and h2 are : 98,112
the weight h1 and h2 are : 98,116
the weight h1 and h2 are : 99,6
the weight h1 and h2 are : 99,23
the weight h1 and h2 are : 99,43
the weight h1 and h2 are : 99,45
the weight h1 and h2 are : 99,46
the weight h1 and h2 are : 99,48
the weight h1 and h2 are : 99,53
the weight h1 and h2 are : 99,65
the weight h1 and h2 are : 99,67
the weight h1 and h2 are : 99,83
the weight h1 and h2 are : 99,85
the weight h1 and h2 are : 99,91
the weight h1 and h2 are : 100,7
the weight h1 and h2 are : 100,14
the weight h1 and h2 are : 100,29
the weight h1 and h2 are : 100,46
the weight h1 and h2 are : 100,48
the weight h1 and h2 are : 100,55
the weight h1 and h2 are : 100,57
the weight h1 and h2 are : 100,86
the weight h1 and h2 are : 100,91
the weight h1 and h2 are : 100,110
the weight h1 and h2 are : 100,114
the weight h1 and h2 are : 100,118
the weight h1 and h2 are : 101,6
the weight h1 and h2 are : 101,7
the weight h1 and h2 are : 101,12
the weight h1 and h2 are : 101,23
the weight h1 and h2 are : 101,39
the weight h1 and h2 are : 101,43
the weight h1 and h2 are : 101,46
the weight h1 and h2 are : 101,48
the weight h1 and h2 are : 101,57
the weight h1 and h2 are : 101,58
the weight h1 and h2 are : 101,78
the weight h1 and h2 are : 101,96
the weight h1 and h2 are : 101,109
the weight h1 and h2 are : 102,3
the weight h1 and h2 are : 102,14
the weight h1 and h2 are : 102,23
the weight h1 and h2 are : 102,43
the weight h1 and h2 are : 102,53
the weight h1 and h2 are : 102,56
the weight h1 and h2 are : 102,57
the weight h1 and h2 are : 102,83
the weight h1 and h2 are : 102,91
the weight h1 and h2 are : 102,97
the weight h1 and h2 are : 102,106
the weight h1 and h2 are : 102,114
the weight h1 and h2 are : 102,116
the weight h1 and h2 are : 103,6
the weight h1 and h2 are : 103,23
the weight h1 and h2 are : 103,43
the weight h1 and h2 are : 103,45
the weight h1 and h2 are : 103,46
``` the weight h1 and h2 are : 103,48
the weight h1 and h2 are : 103,53
the weight h1 and h2 are : 103,65
the weight h1 and h2 are : 103,67
the weight h1 and h2 are : 103,83
the weight h1 and h2 are : 103,85
the weight h1 and h2 are : 103,91
the weight h1 and h2 are : 104,6
the weight h1 and h2 are : 104,12
the weight h1 and h2 are : 104,43
the weight h1 and h2 are : 104,45
the weight h1 and h2 are : 104,48
the weight h1 and h2 are : 104,53
the weight h1 and h2 are : 104,65
the weight h1 and h2 are : 104,86
the weight h1 and h2 are : 104,101
the weight h1 and h2 are : 104,106
the weight h1 and h2 are : 104,110
the weight h1 and h2 are : 104,112
the weight h1 and h2 are : 104,116
the weight h1 and h2 are : 104,118
the weight h1 and h2 are : 105,6
the weight h1 and h2 are : 105,12
the weight h1 and h2 are : 105,14
the weight h1 and h2 are : 105,39
the weight h1 and h2 are : 105,67
the weight h1 and h2 are : 105,86
the weight h1 and h2 are : 105,91
the weight h1 and h2 are : 105,92
the weight h1 and h2 are : 105,96
the weight h1 and h2 are : 105,97
the weight h1 and h2 are : 105,118
the weight h1 and h2 are : 106,6
the weight h1 and h2 are : 106,14
the weight h1 and h2 are : 106,48
the weight h1 and h2 are : 106,53
the weight h1 and h2 are : 106,55
the weight h1 and h2 are : 106,58
the weight h1 and h2 are : 106,65
the weight h1 and h2 are : 106,85
the weight h1 and h2 are : 106,91
the weight h1 and h2 are : 106,93
the weight h1 and h2 are : 106,96
the weight h1 and h2 are : 106,97
the weight h1 and h2 are : 106,101
the weight h1 and h2 are : 106,112
the weight h1 and h2 are : 107,3
the weight h1 and h2 are : 107,23
the weight h1 and h2 are : 107,53
the weight h1 and h2 are : 107,55
the weight h1 and h2 are : 107,56
the weight h1 and h2 are : 107,78
the weight h1 and h2 are : 107,91
the weight h1 and h2 are : 107,92
the weight h1 and h2 are : 107,93
the weight h1 and h2 are : 107,112
the weight h1 and h2 are : 107,114
the weight h1 and h2 are : 107,118
the weight h1 and h2 are : 108,7
the weight h1 and h2 are : 108,14
the weight h1 and h2 are : 108,53
the weight h1 and h2 are : 108,57
the weight h1 and h2 are : 108,58
the weight h1 and h2 are : 108,65
the weight h1 and h2 are : 108,85
the weight h1 and h2 are : 108,92 the weight h1 and h2 are : 108,101
the weight h1 and h2 are : 108,109
the weight h1 and h2 are : 108,112
the weight h1 and h2 are : 109,6
the weight h1 and h2 are : 109,14
the weight h1 and h2 are : 109,48
the weight h1 and h2 are : 109,53
the weight h1 and h2 are : 109,55
the weight h1 and h2 are : 109,58
the weight h1 and h2 are : 109,65
the weight h1 and h2 are : 109,85
the weight h1 and h2 are : 109,91
the weight h1 and h2 are : 109,93
the weight h1 and h2 are : 109,96
the weight h1 and h2 are : 109,97
the weight h1 and h2 are : 109,101
the weight h1 and h2 are : 109,112
the weight h1 and h2 are : 110,3
the weight h1 and h2 are : 110,12
the weight h1 and h2 are : 110,43
the weight h1 and h2 are : 110,55
the weight h1 and h2 are : 110,56
the weight h1 and h2 are : 110,65
the weight h1 and h2 are : 110,67
the weight h1 and h2 are : 110,96
the weight h1 and h2 are : 110,97
the weight h1 and h2 are : 110,106
the weight h1 and h2 are : 110,110
the weight h1 and h2 are : 110,116
the weight h1 and h2 are : 111,7
the weight h1 and h2 are : 111,14
the weight h1 and h2 are : 111,29
the weight h1 and h2 are : 111,45
the weight h1 and h2 are : 111,46
the weight h1 and h2 are : 111,56
the weight h1 and h2 are : 111,67
the weight h1 and h2 are : 111,92
the weight h1 and h2 are : 111,96
the weight h1 and h2 are : 111,101
the weight h1 and h2 are : 111,106
the weight h1 and h2 are : 111,114
the weight h1 and h2 are : 111,116
the weight h1 and h2 are : 111,118
the weight h1 and h2 are : 112,12
the weight h1 and h2 are : 112,14
the weight h1 and h2 are : 112,23
the weight h1 and h2 are : 112,29
the weight h1 and h2 are : 112,46
the weight h1 and h2 are : 112,65
the weight h1 and h2 are : 112,78
the weight h1 and h2 are : 112,86
the weight h1 and h2 are : 112,91
the weight h1 and h2 are : 112,92
the weight h1 and h2 are : 112,96
the weight h1 and h2 are : 112,114
the weight h1 and h2 are : 112,116
the weight h1 and h2 are : 112,118
the weight h1 and h2 are : 113,6
the weight h1 and h2 are : 113,14
the weight h1 and h2 are : 113,45
the weight h1 and h2 are : 113,53
the weight h1 and h2 are : 113,57
the weight h1 and h2 are : 113,65
the weight h1 and h2 are : 113,78
the weight h1 and h2 are : 113,85
the weight h1 and h2 are : 113,86

```
the weight h1 and h2 are : 113,92
the weight h1 and h2 are : 113,96
the weight h1 and h2 are : 113,106
the weight h1 and h2 are : 113,109
the weight h1 and h2 are : 113,110
the weight h1 and h2 are : 114,3
the weight h1 and h2 are : 114,29
the weight h1 and h2 are : 114,45
the weight h1 and h2 are : 114,46
the weight h1 and h2 are : 114,48
the weight h1 and h2 are : 114,55
the weight h1 and h2 are : 114,57
the weight h1 and h2 are : 114,58
the weight h1 and h2 are : 114,65
the weight h1 and h2 are : 114,92
the weight h1 and h2 are : 114,101
the weight h1 and h2 are : 114,109
the weight h1 and h2 are : 115,6
the weight h1 and h2 are : 115,14
the weight h1 and h2 are : 115,45
the weight h1 and h2 are : 115,53
the weight h1 and h2 are : 115,57
the weight h1 and h2 are : 115,65
the weight h1 and h2 are : 115,78
the weight h1 and h2 are : 115,85
the weight h1 and h2 are : 115,86
the weight h1 and h2 are : 115,92
the weight h1 and h2 are : 115,96
the weight h1 and h2 are : 115,106
the weight h1 and h2 are : 115,109
the weight h1 and h2 are : 115,110
the weight h1 and h2 are : 116,3
the weight h1 and h2 are : 116,7
the weight h1 and h2 are : 116,14
the weight h1 and h2 are : 116,29
the weight h1 and h2 are : 116,48
the weight h1 and h2 are : 116,56
the weight h1 and h2 are : 116,91
the weight h1 and h2 are : 116,96
the weight h1 and h2 are : 116,106
the weight h1 and h2 are : 116,109
the weight h1 and h2 are : 116,110
the weight h1 and h2 are : 116,112
the weight h1 and h2 are : 116,114
the weight h1 and h2 are : 117,12
the weight h1 and h2 are : 117,39
the weight h1 and h2 are : 117,46
the weight h1 and h2 are : 117,58
the weight h1 and h2 are : 117,67
the weight h1 and h2 are : 117,85
the weight h1 and h2 are : 117,91
the weight h1 and h2 are : 117,92
the weight h1 and h2 are : 117,93
the weight h1 and h2 are : 117,97
the weight h1 and h2 are : 117,109
the weight h1 and h2 are : 117,110
the weight h1 and h2 are : 117,114
the weight h1 and h2 are : 117,118
the weight h1 and h2 are : 118,3
the weight h1 and h2 are : 118,6
the weight h1 and h2 are : 118,7
the weight h1 and h2 are : 118,23
the weight h1 and h2 are : 118,56
the weight h1 and h2 are : 118,65
the weight h1 and h2 are : 118,67
the weight h1 and h2 are : 118,85
```

```
the weight h1 and h2 are : 118,86
the weight h1 and h2 are : 118,93
the weight h1 and h2 are : 118,110
the weight h1 and h2 are : 118,112
the weight h1 and h2 are : 118,118
the weight h1 and h2 are : 119,3
the weight h1 and h2 are : 119,14
the weight h1 and h2 are : 119,23
the weight h1 and h2 are : 119,43
the weight h1 and h2 are : 119,53
the weight h1 and h2 are : 119,56
the weight h1 and h2 are : 119,57
the weight h1 and h2 are : 119,83
the weight h1 and h2 are : 119,91
the weight h1 and h2 are : 119,97
the weight h1 and h2 are : 119,106
the weight h1 and h2 are : 119,114
the weight h1 and h2 are : 119,116
the weight h1 and h2 are : 120,3
the weight h1 and h2 are : 120,6
the weight h1 and h2 are : 120,43
the weight h1 and h2 are : 120,53
the weight h1 and h2 are : 120,55
the weight h1 and h2 are : 120,56
the weight h1 and h2 are : 120,58
the weight h1 and h2 are : 120,85
the weight h1 and h2 are : 120,86
the weight h1 and h2 are : 120,96
the weight h1 and h2 are : 120,101
the weight h1 and h2 are : 120,114
the weight h1 and h2 are : 121,3
the weight h1 and h2 are : 121,6
the weight h1 and h2 are : 121,43
the weight h1 and h2 are : 121,53
the weight h1 and h2 are : 121,55
the weight h1 and h2 are : 121,56
the weight h1 and h2 are : 121,58
the weight h1 and h2 are : 121,85
the weight h1 and h2 are : 121,86
the weight h1 and h2 are : 121,96
the weight h1 and h2 are : 121,101
the weight h1 and h2 are : 121,114
the weight h1 and h2 are : 122,7
the weight h1 and h2 are : 122,14
the weight h1 and h2 are : 122,29
the weight h1 and h2 are : 122,46
the weight h1 and h2 are : 122,48
the weight h1 and h2 are : 122,55
the weight h1 and h2 are : 122,57
the weight h1 and h2 are : 122,86
the weight h1 and h2 are : 122,91
the weight h1 and h2 are : 122,110
the weight h1 and h2 are : 122,114
the weight h1 and h2 are : 122,118
the weight h1 and h2 are : 123,7
the weight h1 and h2 are : 123,12
the weight h1 and h2 are : 123,43
the weight h1 and h2 are : 123,45
the weight h1 and h2 are : 123,46
the weight h1 and h2 are : 123,56
the weight h1 and h2 are : 123,78
the weight h1 and h2 are : 123,83
the weight h1 and h2 are : 123,85
the weight h1 and h2 are : 123,92
the weight h1 and h2 are : 123,97
the weight h1 and h2 are : 123,101
```

```
the weight h1 and h2 are : 123,110
the weight h1 and h2 are : 123,112
the weight h1 and h2 are : 124,3
the weight h1 and h2 are : 124,12
the weight h1 and h2 are : 124,23
the weight h1 and h2 are : 124,45
the weight h1 and h2 are : 124,85
the weight h1 and h2 are : 124,86
the weight h1 and h2 are : 124,93
the weight h1 and h2 are : 124,96
the weight h1 and h2 are : 124,97
the weight h1 and h2 are : 124,106
the weight h1 and h2 are : 124,109
the weight h1 and h2 are : 125,7
the weight h1 and h2 are : 125,23
the weight h1 and h2 are : 125,45
the weight h1 and h2 are : 125,46
the weight h1 and h2 are : 125,48
the weight h1 and h2 are : 125,53
the weight h1 and h2 are : 125,57
the weight h1 and h2 are : 125,58
the weight h1 and h2 are : 125,67
the weight h1 and h2 are : 125,78
the weight h1 and h2 are : 125,86
the weight h1 and h2 are : 125,97
the weight h1 and h2 are : 125,114
the weight h1 and h2 are : 126,7
the weight h1 and h2 are : 126,14
the weight h1 and h2 are : 126,53
the weight h1 and h2 are : 126,57
the weight h1 and h2 are : 126,58
the weight h1 and h2 are : 126,65
the weight h1 and h2 are : 126,85
the weight h1 and h2 are : 126,92
the weight h1 and h2 are : 126,101
the weight h1 and h2 are : 126,109
the weight h1 and h2 are : 126,112
```

What is claimed is:

1. A method for programming transmitters for use in conjunction with a receiver for authenticating said transmitters, wherein each of said transmitters transmits a message signal to said receiver when activated, said message signal including a transmitter identification number field, a transmitter rolling code state number field, and a transmitter clock counter field, said method comprising the steps of:

assigning unique transmitter identification codes to each of at least one transmitters;

placing said receiver in learning mode;

sequentially activating each transmitter and thereby sending said message signal to said receiver;

receiving said message signal at said receiver;

storing, in corresponding registers within said receiver, said identification number, rolling code state and clock counter for each of said transmitters; and removing said receiver from said learning mode and placing said receiver in normal operation mode.

2. A method for assigning unique identification codes to a family of transmitters used in conjunction with a receiver, and for registering each transmitter of said family of transmitters with said receiver, and for registering a replacement transmitter in place of one of said transmitters, said method comprising the steps of:

(a) assigning unique identification codes to each transmitter in said family of transmitters by:
   (i) sequentially assigning an ordinal number to each said transmitter, and
   (ii) assigning a key number to each said transmitter;

(b) registering each said transmitter of said family of transmitters with said receiver by:
   (i) storing, in corresponding registers within said receiver in concatenated fashion within each said register, said ordinal number and said key number for each transmitter; and (c) registering a replacement transmitter in place of one of said transmitters by:
   (i) assigning an ordinal number to said replacement transmitter identical to said assigned ordinal number of said transmitter being replaced,
   (ii) assigning a key number to said replacement transmitter which is greater in value than said key number of said transmitter being replaced, and
   (iii) storing, in said corresponding register within said receiver, said replacement transmitter key number in concatenated fashion with said pre-existing stored ordinal number.

3. A method for providing secure remote actuation of a vehicle door locking and unlocking mechanism employing a remote transmitter and a receiver, wherein said receiver issues a lock/unlock command to said locking and unlocking mechanism only after having authenticated a lock/unlock request from said transmitter, said transmitter having a unique transmitter identification number, a first rolling code generator, a rolling code state counter, a clock counter, and signal producing means for producing a message signal having fields for said identification number, a rolling code generated by said first rolling code generator, and said rolling code state counter value, and said receiver having a second rolling code generator, said method comprising the steps of:

(a) storing in said receiver said identification number, said rolling code state counter value and said clock counter value for each authorized transmitter during a learning mode;

(b) generating said rolling code within said transmitter using said transmitter rolling code state counter value;

(c) transmitting said transmitter identification number, said generated rolling code, and said rolling code state counter value from said transmitter to said receiver as said message signal;

(d) incrementing said transmitter clock counter;

(e) incrementing said rolling code state counter;

(f) receiving said message signal at said receiver;

(g) comparing said transmitter identification number with said stored authorized identification number, and proceeding if said received transmitter identification number matches one of said stored authorized identification numbers;

(h) comparing said received transmitted rolling code state counter value to said stored rolling code state counter value and
   (i) if said received value exceeds said stored value, increasing said stored value to match said received value,
   (ii) if said received value matches said stored value, leaving said stored value unchanged;

(i) generating a rolling code within said receiver said stored rolling code state counter value;

(j) comparing said received transmitter rolling code to said generated receiver rolling code; and (k) issuing said lock/unlock command only if said transmitter and receiver rolling codes match.

4. A method for providing unique transmitter identification numbers, for programming a receiver to recognize authorized transmitters, and for providing secure remote actuation of a vehicle door locking and unlocking mechanism employing a remote transmitter and a receiver, wherein said receiver issues a lock/unlock command to said locking and unlocking mechanism only after having authenticated a lock/unlock request from said transmitter, said transmitter having a unique transmitter identification number, a first rolling code generator, a rolling code state counter, a clock counter, and signal producing means for producing a message signal having fields for said identification number, a rolling code generated by said first rolling code generator, and said rolling code state counter value, and said receiver having a second rolling code generator, said method comprising the steps of:

(a) assigning unique transmitter identification numbers to each transmitter in a family of authorized transmitters by:
   (1) sequentially assigning an ordinal number to each said transmitter, and
   (2) assigning a key number to each transmitter;

(b) programming said receiver to recognize each said transmitter in said family of authorized transmitters by
   (1) placing said receiver in a learning mode,
   (2) sequentially activating each transmitter to transmit its identification number, its rolling code state counter value and its clock counter value to said receiver,
   (3) storing, in corresponding registers, said identification number, said rolling code state counter value and said clock counter value for each said transmitter, and
   (4) removing said receiver from said learning mode and placing said receiver in a normal mode of operation; and (c) authenticating a lock/unlock request from a transmitter by:
  (1) generating said rolling code within said transmitter using said transmitter rolling code state counter value;
  (2) transmitting said transmitter identification number, said generated rolling code, and said rolling code state counter value from said transmitter to said receiver as said message signal;
  (3) incrementing said transmitter clock counter;
  (4) incrementing said rolling code state counter;
  (5) receiving said message signal at said receiver;
  (6) comparing said transmitter identification number with said stored authorized identification number, and proceeding if said received transmitter key number matches one of said stored authorized identification numbers;
  (7) comparing said received transmitted rolling code state counter value to said stored rolling code state counter value and
    (i) if said received value exceeds said stored value, increasing said stored value to match said received value,
    (ii) if said received value matches said stored value, leaving said stored value unchanged;
  (8) generating a rolling code within said receiver said stored rolling code state counter value;
  (9) comparing said received transmitter rolling code to said generated receiver rolling code; and
  (10) issuing said lock/unlock command only if said transmitter and receiver rolling codes match.

* * * * *